US 7,580,636 B2

(12) United States Patent
Nogi

(10) Patent No.: US 7,580,636 B2
(45) Date of Patent: Aug. 25, 2009

(54) OPTICAL SWITCH AND METHOD FOR CONTROLLING OPTICAL PATH THEREOF

(75) Inventor: Yoshio Nogi, Fujisawa (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 451 days.

(21) Appl. No.: 11/324,316

(22) Filed: Jan. 4, 2006

(65) Prior Publication Data

US 2006/0233549 A1 Oct. 19, 2006

(30) Foreign Application Priority Data

Apr. 14, 2005 (JP) ............... 2005-116748

(51) Int. Cl.
*H04J 14/00* (2006.01)
*H04B 10/20* (2006.01)
(52) U.S. Cl. .............. 398/49; 398/45; 398/48; 398/50; 398/51; 398/58; 398/61
(58) Field of Classification Search .......... 398/45, 398/48, 49, 50, 51, 58, 61, 89
See application file for complete search history.

(56) References Cited

U.S. PATENT DOCUMENTS 6,407,851 B1 * 6/2002 Islam et al. ............ 359/291

7,228,071 B2 * 6/2007 Park et al. ............ 398/49

FOREIGN PATENT DOCUMENTS

JP 2004-320527 11/2004

OTHER PUBLICATIONS

M.S. Goodman, "Multiwavelength Networks and New Approaches to Packet Switching", Oct. 1989, IEEE Communications Magazing, pp. 27-35.*

* cited by examiner

*Primary Examiner*—Ken N Vanderpuye
*Assistant Examiner*—Daniel G Dobson
(74) *Attorney, Agent, or Firm*—Antonelli, Terry, Stout & Kraus, LLP.

(57) ABSTRACT

An optical switch is provided with: an optical matrix switch; and an optical path decision section which divides input light into two branches, supplies the input light of one divided branch to the optical matrix switch, demultiplexes the input light of the other divided branch into the light of individual wavelengths, subjects the demultiplexed optical signals to photoelectric conversion and generates electric signals corresponding to individual wavelengths, outputs connection request signals to SW connection request adjustment circuits for O1 to O4 which are set beforehand for individual wavelengths by receiving the generated electric signals, supplies, to the optical matrix switch, input port information JP corresponding to connection request transmitters from which the connection request signals are output, and decides optical paths in the optical matrix switch.

9 Claims, 16 Drawing Sheets

<ROUTING TABLE OF OPTICAL SWITCH 1>

|    | λ1 | λ2 | λ3 | λ4 |
|----|----|----|----|----|
| I1 |    | O2 |    |    |
| I2 | O1 |    |    |    |
| I3 |    |    |    | O4 |
| I4 |    |    | O3 |    |

<ROUTING TABLE OF OPTICAL SWITCH 1>

|    | $\lambda 1$ | $\lambda 2$ | $\lambda 3$ | $\lambda 4$ |
|----|----|----|----|----|
| I1 |    |    |    | O4 |
| I2 |    |    | O3 |    |
| I3 |    | O2 |    |    |
| I4 | O1 |    |    |    |

<ROUTING TABLE OF OPTICAL SWITCH 15>

|    | λ1 | λ2 | λ3 | λ4 | λ5 |
|----|----|----|----|----|----|
| I1 | O3 |    |    |    |    |
| I2 |    | O5 |    |    |    |
| I3 | O1 |    |    |    |    |
| I4 |    |    |    |    |    |
| I5 |    | O2 |    |    |    |

<ROUTING TABLE OF OPTICAL SWITCH 15>

|    | λ1 | λ2 | λ3 | λ4 | λ5 |
|----|----|----|----|----|----|
| I1 |    |    | O4 |    |    |
| I2 |    | O5 |    |    |    |
| I3 |    |    | O1 |    |    |
| I4 |    |    |    |    |    |
| I5 |    | O2 |    |    |    |

<ROUTING TABLE OF OPTICAL SWITCH 15>

|    | λ1 | λ2 | λ3 | λ4 | λ5 |
|----|----|----|----|----|----|
| I1 | O3 |    |    |    |    |
| I2 |    |    |    | O5 |    |
| I3 | O1 |    |    |    |    |
| I4 |    |    |    |    |    |
| I5 |    |    |    | O2 |    |

<ROUTING TABLE OF OPTICAL SWITCH 15>

|    | λ1 | λ2 | λ3 | λ4 | λ5 |
|----|----|----|----|----|----|
| I1 |    |    | O4 |    |    |
| I2 |    |    |    | O5 |    |
| I3 |    |    |    |    |    |
| I4 |    |    | O1 |    |    |
| I5 |    |    |    | O2 |    |

FIG.13
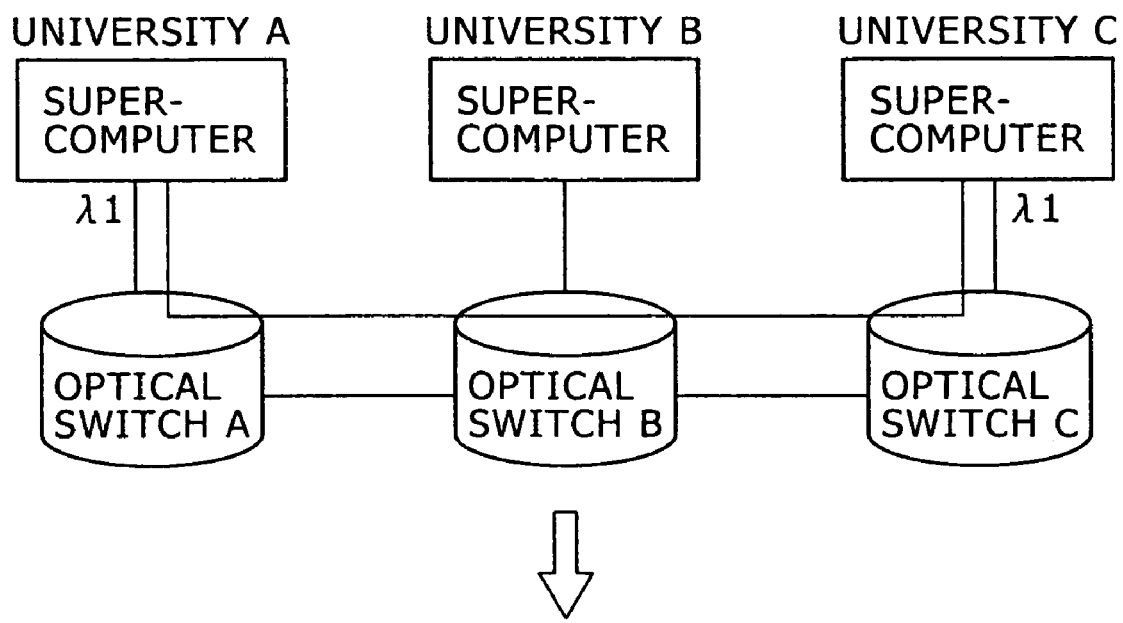
<CERTAIN TIME ZONE>
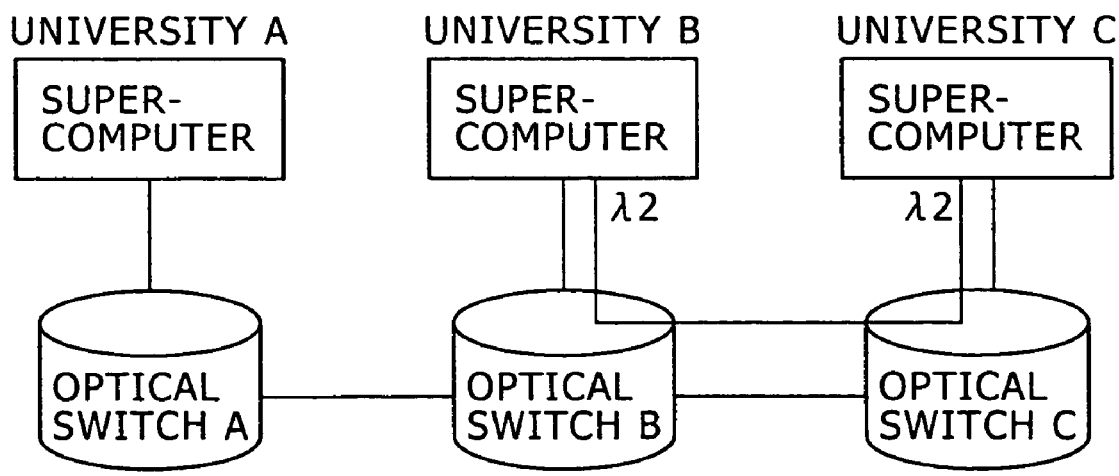
<ANOTHER TIME ZONE>

FIG.14
<IN DAYTIME>
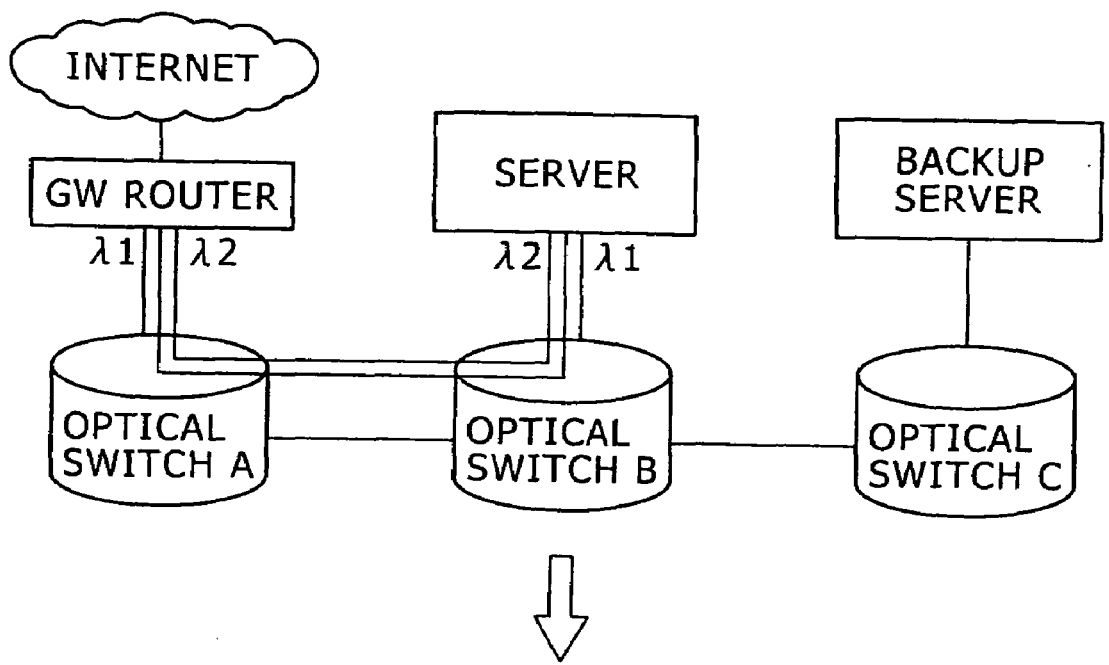
<AT NIGHT>
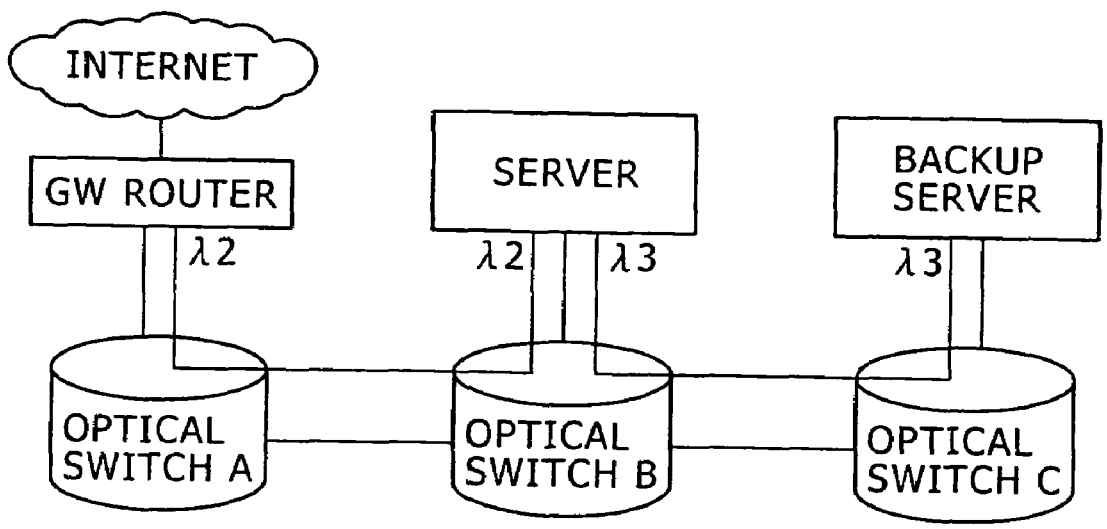

OPTICAL SWITCH AND METHOD FOR CONTROLLING OPTICAL PATH THEREOF

CLAIM OF PRIORITY

The present application claims priority from Japanese patent application serial no. 2005-116748, filed on Apr. 14, 2005, the content of which is hereby incorporated by reference into this application.

BACKGROUND OF THE INVENTION

The present invention relates to an optical switch that decides the optical paths of input light coming from input ports and outputs the light from output ports, in particular to an optical switch of autonomous hardware capable of outputting input light coming from arbitrary input ports from arbitrary output ports and a method for controlling the optical paths thereof.

A method of transmitting optical signals by passing the light itself through optical paths without applying photoelectric conversion in optical path controlling is disclosed in JP-A No. 320527/2004 (refer to FIGS. 6 and 7 for example).

In the method, an optical wavelength router is provided with: M units of demultiplexing circuits which are allocated in accordance with input ports and demultiplex M-way wavelength multiplexing light signals into the light signals of individual wavelengths; M units of multiplexing circuits which are allocated in accordance with output ports and multiplex M kinds of light signals having different wavelengths; and M-square (M×M) units of optical paths which connect the demultiplexing circuits to the multiplexing circuits so that M units of transceivers optically interconnected to the input and output ports are in the state of full-mesh connection.

By such a configuration, even in the case of increasing or decreasing the number of transceivers connected to an optical wavelength router, it is basically possible to construct a full-mesh network having wavelength cyclicity only by changing a connection mode of the optical paths of the optical wavelength router. Therefore, it is not necessary to change the optical wavelength router itself to another optical wavelength router when the number of the transceivers is increased or decreased. As a consequence, the aforementioned configuration has very high flexibility in response to the decrease or increase of the number of transceivers.

Here, in the configuration, with regard to the optical paths connecting M units of demultiplexing circuits to M units of multiplexing circuits, one line of an optical path is fixedly allocated to each wavelength.

Further, since the configuration has wavelength cyclicity, a port and a wavelength are uniquely related under the circumstance of wavelength multiplexing signals and it is possible to enhance the wavelength utilization efficiency without causing the collision of wavelengths in an identical port.

In the method disclosed in JP-A No. 320527/2004, the wavelength of an optical signal and the port thereof are in the relation of one to one and the relation between them is invariable, and hence it is impossible to share an empty source (optical path) among plural paths. As a consequence, the method lacks flexibility.

Hence, it is possible to install only one unit of such a device as disclosed in JP-A No. 320527/2004 in the center and apply the device to a star-shaped network that covers a metro area. However, when such devices are applied to a wide-area mesh network wherein the devices are connected in a multistage form, since the optical signals of different wavelengths in an identical path are inevitably output to different paths, the allocation and control of the paths and wavelengths are hardly secured.

In addition, a device disclosed in JP-A No. 320527/2004 includes passive elements and thus the electric power consumption is kept low. However, it may be difficult to know the usage of the paths including output ports and thus the device cannot deal with the case where the usage of paths must be grasped.

SUMMARY OF THE INVENTION

The present invention has been established in order to solve the above problems. The present invention makes it possible to provide an optical switch capable of: dividing input light; generating electric signals by applying photoelectric conversion corresponding to wavelengths; deciding the connection relation between input ports to which the input light is input and relevant output ports on the basis of the electric signals; and freely deciding optical paths between arbitrary input ports and arbitrary output ports in an optical matrix switch, and an optical path control method thereof.

The optical switch is provided with: an optical matrix switch which has plural input ports and plural output ports and outputs input light coming from the input ports from the output ports; and an optical path decision section which divides input light from each of input terminals into two branches, supplies the input light of one divided branch to the input ports of the optical matrix switch, demultiplexes the input light of the other divided branch into the light of individual wavelengths, subjects the demultiplexed optical signals to photoelectric conversion and generates electric signals corresponding to individual wavelengths, supplies, to the optical matrix switch, input port information corresponding to connection request signals which are set beforehand for individual wavelengths by receiving the electric signals, and decides the optical paths from the input ports to intended output ports in the optical matrix switch.

Further, the optical path control method of the optical switch includes the steps of: dividing input light into two branches and supplying the input light of one divided branch to input ports of the optical matrix switch; demultiplexing the input light of the other divided branch into the light of individual wavelengths and outputting the demultiplexed optical signals; subjecting the demultiplexed optical signals to photoelectric conversion and generating electric signals corresponding to individual wavelengths; receiving the electric signals and transmitting connection request signals which are set beforehand for individual wavelengths; receiving the connection request signals and supplying corresponding input port information to the optical matrix switch; and optically connecting input ports to intended output ports in the optical matrix switch on the basis of the input port information and allowing the input light to permeate.

BRIEF DESCRIPTION OF THE DRAWINGS

Preferred embodiments of the present invention will now be described in conjunction with the accompanying drawings, in which:

FIG. 13 is an illustration explaining services of optical switches;

FIG. 14 is an illustration explaining other services of optical switches;

DESCRIPTION OF THE PREFERRED EMBODIMENTS

Figure 1:
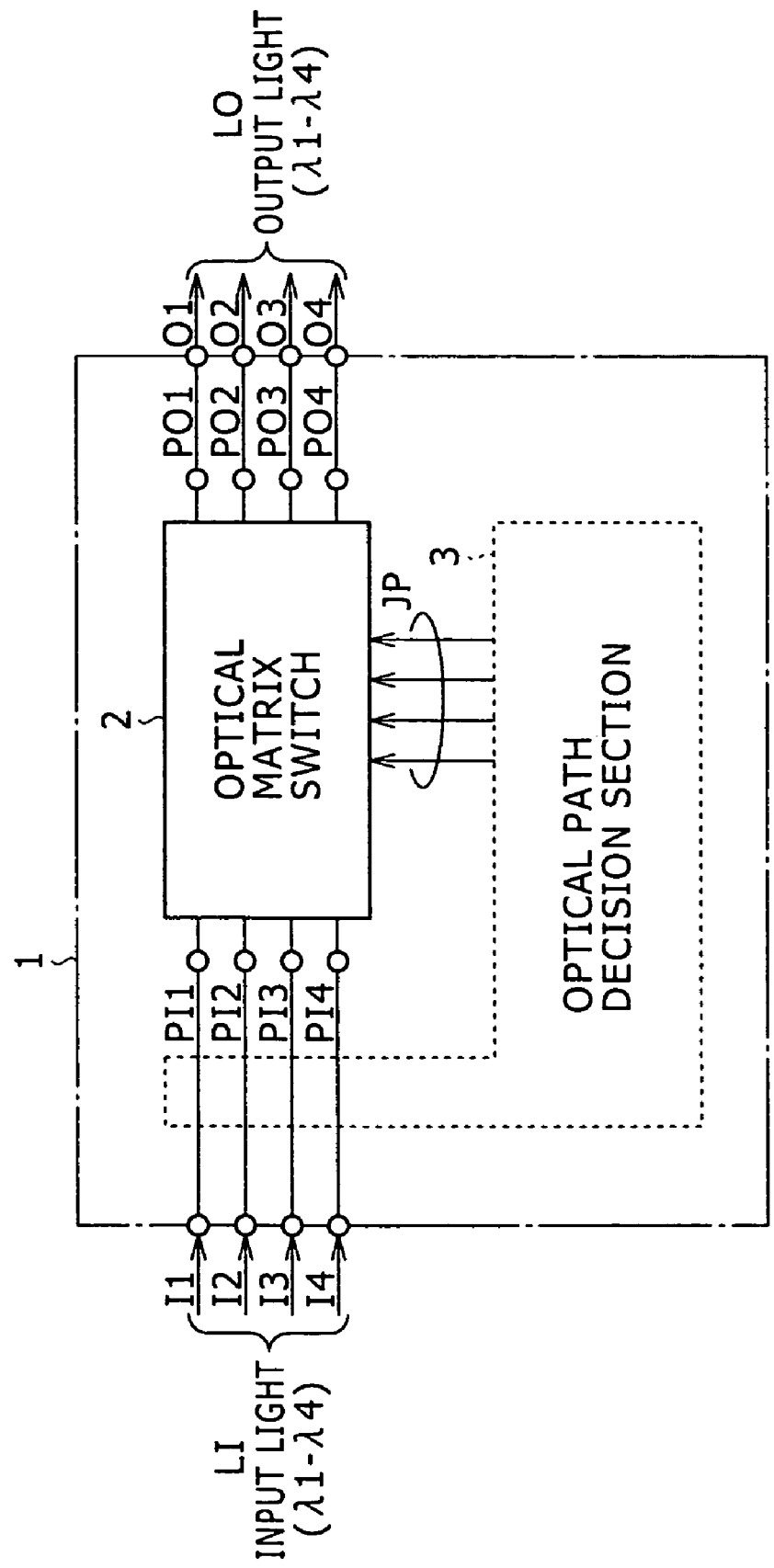
FIG. 1 is a basic block diagram of an optical switch.

The embodiments according to the present invention will hereunder be explained in conjunction with the accompanying drawings. FIG. 1 is a basic block diagram of an optical switch. Here, the present embodiment is explained on the basis of the case where a 4×4 matrix switch having input terminals I1 to I4 and output terminals O1 to O4 is used. In FIG. 1, an optical switch 1 includes an optical matrix switch 2 and an optical path decision section 3.

The optical matrix switch 2 uses micro-mirrors at cross points in a matrix and drives the micro-mirrors on the basis of input port information JP supplied from the optical path decision section 3. The optical matrix switch 2 decides optical paths and outputs input light LI of the optical wavelengths $\lambda 1$ to $\lambda 4$ input from input ports PI1 to PI4 through the input terminals I1 to I4 as output light LO of the optical wavelengths $\lambda 1$ to $\lambda 4$ from output ports PO1 to PO4 through the output terminals O1 to O4.

The optical path decision section 3 divides the input light LI of the optical wavelengths $\lambda 1$ to $\lambda 4$ input from the input terminals I1 to I4 into two branches. The optical path decision section 3 supplies the input light LI of one divided branch to the input ports PI1 to PI4 of the optical matrix switch 2, demultiplexes the input light LI of the other divided branch into the light of individual wavelengths (optical wavelengths $\lambda 1$ to $\lambda 4$), subjects the demultiplexed optical signals to photoelectric conversion, and thus generates electric signals corresponding to the individual wavelengths.

Further, the optical path decision section 3 receives the electric signals generated in response to the individual wavelengths and supplies the input port information JP of the access points to the output ports of the optical matrix set beforehand for individual wavelengths. Thereby, the optical path decision section 3 decides the optical paths from the input ports PI1 to PI4 to intended output ports PO1 to PO4 in the optical matrix switch 2.

By so doing, the optical switch 1 can freely decide the optical paths between arbitrary input ports PI1 to PI4 and arbitrary output ports PO1 to PO4 in the optical matrix switch 2 in accordance with the optical wavelengths received at the input ports PI1 to PI4.

Figure 2:
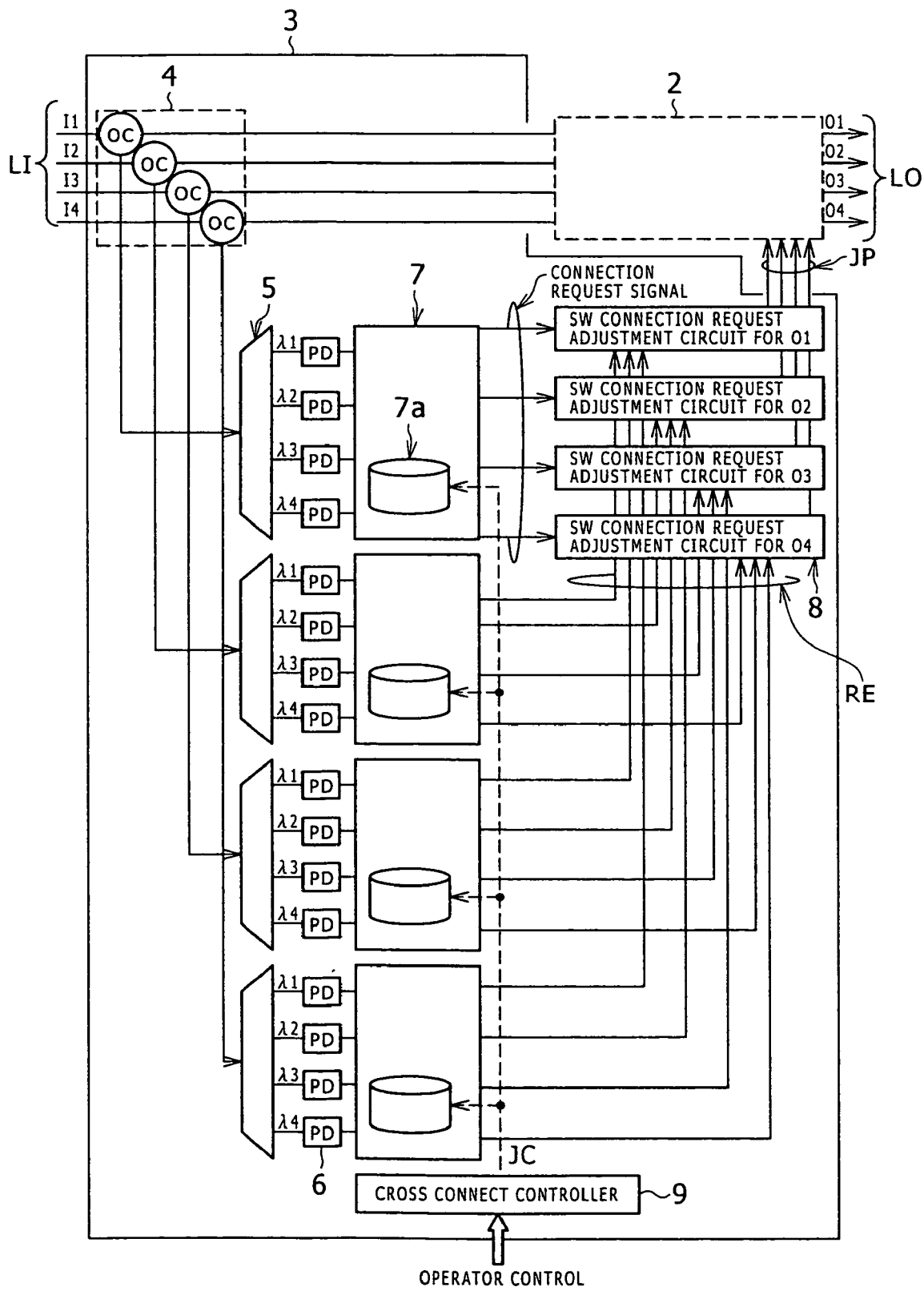
FIG. 2 is a block diagram of an optical path decision section.

FIG. 2 is a block diagram of an optical path decision section. In FIG. 2, the optical path decision section 3 includes optical couplers 4, wavelength filters 5, photodiodes 6, connection request transmitters 7, switch connection request adjustment sections 8, and a cross connect controller 9.

As the optical couplers 4, four optical couplers are inserted between the input terminals I1 to I4 and the input ports PI1 to PI4 respectively, divide the input light LI (optical wavelengths $\lambda 1$ to $\lambda 4$) supplied from the input terminals I1 to I4 into two branches, and supply the input light LI (optical wavelengths $\lambda 1$ to $\lambda 4$) of one divided branch to the input ports of the optical matrix switch 2. Further, the optical couplers 4 supply the input light LI (optical wavelengths $\lambda 1$ to $\lambda 4$ of the other divided branch to the four wavelength filters 5 respectively.

The wavelength filters 5 are composed of four circuits corresponding to the input terminals I1 to I4. Each of the wavelength filters 5 demultiplexes the input light LI (optical wavelengths $\lambda 1$ to $\lambda 4$) of the other branch and outputs the optical signals of the optical wavelengths $\lambda 1$ to $\lambda 4$ of the input light LI. Here, each of the wavelength filters 5 including four circuits has four output ports to output the optical signals of the optical wavelengths $\lambda 1$ to $\lambda 4$ and thus the wavelength filters 5 have 16 (=4×4) output ports of the optical signals in total.

The photodiodes 6 include one photodiode for each of the optical signals of the optical wavelengths $\lambda 1$ to $\lambda 4$ output from the wavelength filters 5 (four photodiodes for each of the wavelength filters 5 and thus 16 photodiodes for the whole wavelength filters 5 having four wavelength filters), subject the optical signals of the optical wavelengths $\lambda 1$ to $\lambda 4$ to photoelectric conversion, and supply the converted electric signals having a pulse shape (for example, of a high level (hereunder referred to as "H level") in the case where an optical signal exists and of a low level (hereunder referred to as "L level") in the case where an optical signal does not exist) to the connection request transmitters 7.

The connection request transmitters 7 are composed of four circuits corresponding to the input terminals I1 to I4 in the same way as the wavelength filters 5 and each of the connection request transmitters 7 receives the electric signals (four inputs) corresponding to the optical wavelengths $\lambda 1$ to $\lambda 4$ output from the relevant photodiodes 6. The connection request transmitters 7 output connection request signals RE to the SW connection request adjustment circuits for O1 to O4 corresponding to the output ports PO1 to PO4, which circuits decide each of the output ports PO1 to PO4 of the optical matrix switch 2 from which each of the input light LI input into the input ports PI1 to PI4 of the optical matrix switch 2 is output.

Further, the connection request transmitters 7 have memories 7a to store the correspondence of individual wavelengths with the SW connection request adjustment circuits for O1 to O4 to which the connection request signals RE are output, and write a routing table or change a routing table written beforehand and then store the routing table on the basis of wavelength-correspondent cross connect information JC supplied from the cross connect controller 9. Here, the routing table is a table which describes definition information that defines the SW connection request adjustment circuits for O1 to O4 to which the connection request signals RE of individual wavelengths are output. When the connection request transmitters 7 receive electric signals corresponding to the optical wavelengths $\lambda 1$ to $\lambda 4$ supplied from the photodiodes 6, the connection request transmitters 7 output the connection request signals RE to any of the SW connection request adjustment circuits for O1 to O4 stored in the routing table of the memories 7a.

That is, the connection request transmitters 7 issue connection request signals RE to the SW connection request adjustment circuits for O1 to O4 to which the connection request signals RE stored in the connection request transmitters 7 are output and thereby the input light LI of the optical wavelengths $\lambda 1$ to $\lambda 4$ input from the input terminals I1 to I4 designates the optical paths to the output ports PO1 to PO4 which are the access points from the input ports PI1 to PI4 in the optical matrix switch 2. Here, the connection request transmitters 7 supply the connection request signals RE to the SW connection request adjustment circuits for O1 to O4 corresponding to the output ports PO1 to PO4.

The cross connect controller 9 supplies wavelength-correspondent cross connect information JC to the connection request transmitters 7 by input control from outside such as an operator, and registers the information in the memories 7a as the routing table which is the definition information that defines the SW connection request adjustment circuits for O1 to O4 to which the connection request signals RE of individual wavelengths are output. Here, the wavelength-correspondent cross connect information JC is information set at the connection request signals RE in order to define the output terminals O1 to O4 from which the input light LI of the input terminals I1 to I4 is output in response to the electric signals ES supplied from the photodiodes 6.

Further, when the cross connect controller 9 resisters the table entry defining the SW connection request adjustment circuits for O1 to O4 to which the connection request signals RE are output in response to individual wavelengths to the routing table of the memories 7a, the cross connect controller 9 connectedly resisters the data of the optical wavelengths $\lambda 1$ to $\lambda 4$ of the input light LI corresponding to the input terminals I1 to I4 and the output terminals O1 to O4 (or the output ports PO1 to PO4).

The switch connection request adjustment section 8 includes four SW connection request adjustment circuits for O1 to O4 corresponding to the output ports PO1 to PO4, receives the connection request signals RE that notify the generation of the connection request to designate the output ports PO1 to PO4 supplied from the connection request transmitters 7 as the access points, supplies to the optical matrix switch 2 the input port information JP (decode signals SD) for driving the micro-mirrors to decide the optical paths of the optical matrix switch 2, connects a relevant input port (for example, the input port PI1) to a relevant output port (for example, the output port PO3) of the optical matrix switch 2, and controls the input light LI (for example, the optical wavelength $\lambda 1$) input from the input terminal I1 so as to be output from the output terminal O3.

Further, each of the SW connection request adjustment circuits for O1 to O4 in the switch connection request adjustment section 8, when it receives simultaneously the connection request signals RE from the connection request transmitters 7 corresponding to plural input ports, allows the permeation of the connection request signal RE from the connection request transmitter 7 corresponding to the top-priority input port and executes exclusive processing to suppress or discard the connection request signals RE from the connection request transmitters 7 corresponding to the other input ports.

Furthermore, the switch connection request adjustment section 8 recognizes the permeation state of the received connection request signals RE, thereby judges the state of use of each of the output ports (output ports PO1 to PO4) to which each of the SW connection request adjustment circuits for O1 to O4 is allocated, recognizes the connection request transmitters 7 from which the connection request signals RE are issued, and thereby judges the input ports (input ports PI1 to PI4) to which the output ports are connected.

Figure 3:
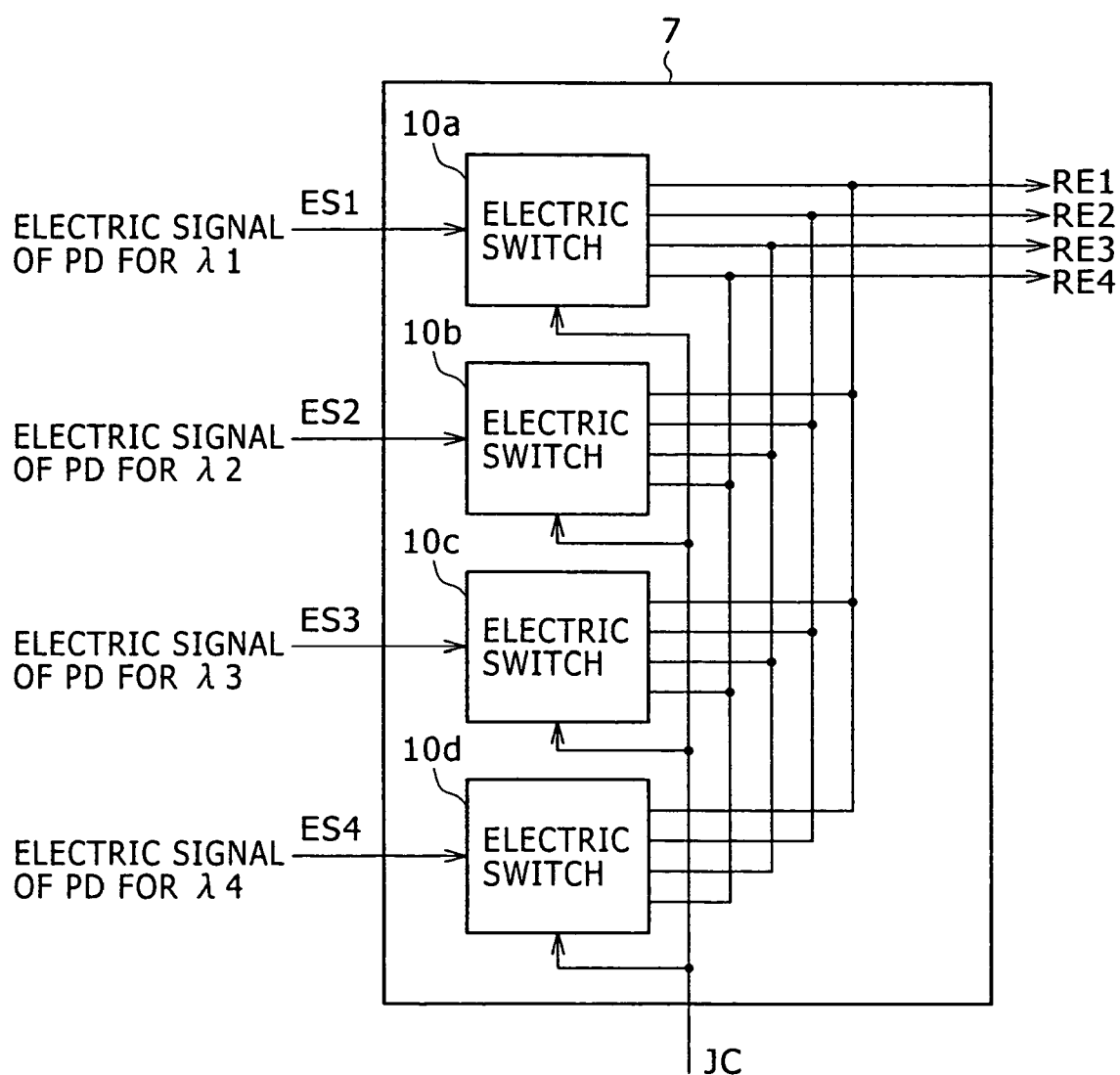
FIG. 3 is a block diagram of a connection request transmitter.

FIG. 3 is a block diagram of a connection request transmitter. Here, in the connection request transmitters 7, the four circuits corresponding to the input terminals I1 to I4 have an identical structure and therefore the explanations are given on the basis of the connection request transmitter of the circuit corresponding to the input light LI input from the input terminal I1.

The connection request transmitter 7 is provided with electric switches 10a to 10d, receives electric signals ES1 to ES4 supplied from the respective photodiodes 6 for the respective optical wavelengths $\lambda 1$ to $\lambda 4$, and outputs the connection request signals RE1(I1) to RE1(I4) in accordance with the access points to which the SW connection request adjustment circuits for O1 to O4 of the switch connection request adjustment section 8 are connected on the basis of the information, which is registered beforehand in the routing table of the memory 7a on the basis of the wavelength-correspondent cross connect information JC in accordance with the electric signals ES1 to ES4 of the optical wavelengths $\lambda 1$ to $\lambda 4$ and defines the SW connection request adjustment circuits for O1 to O4 to which the connection request signals RE are output.

Figure 4:
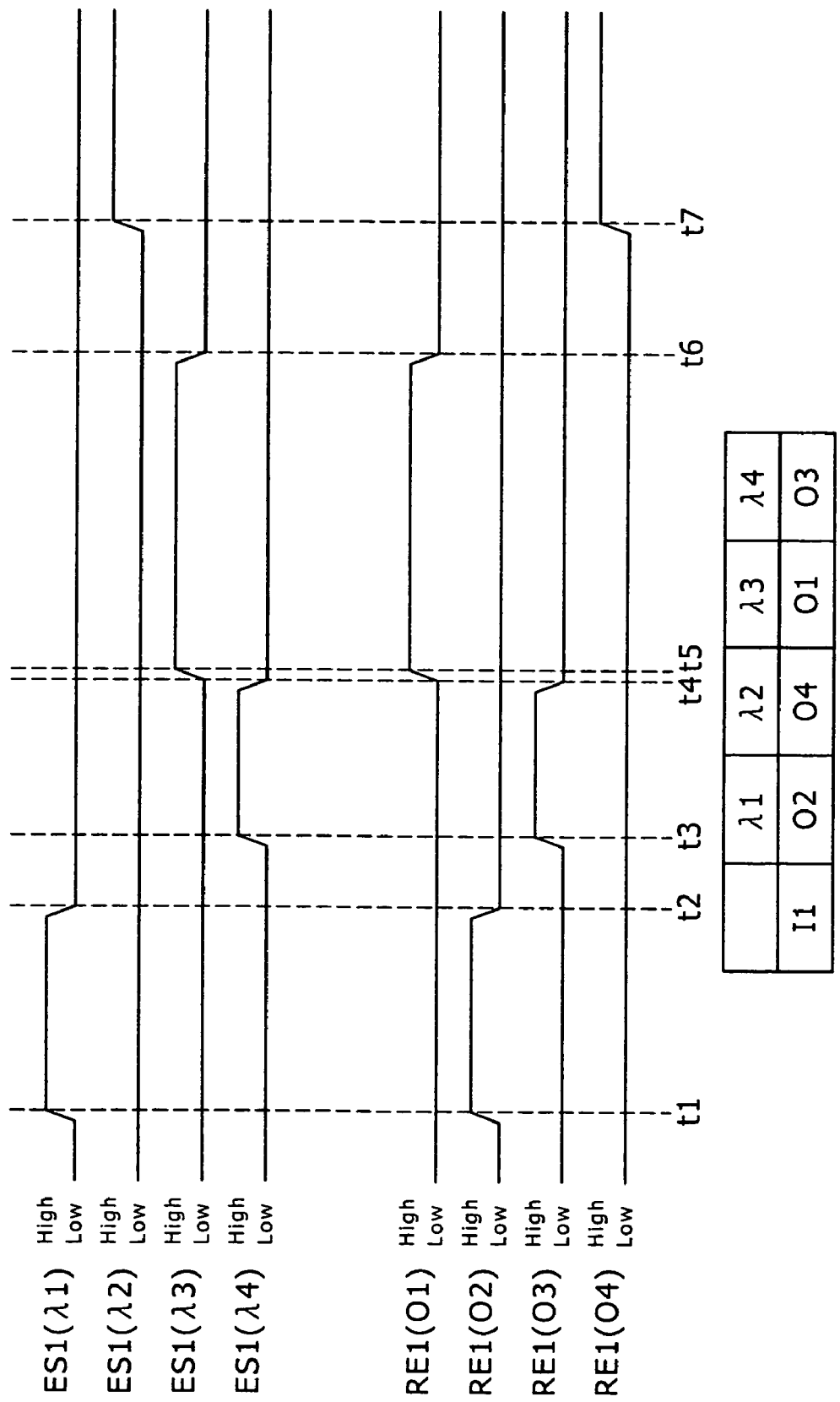
FIG. 4 is an operation timing chart of input signals and output signals based on the routing table of a connection request transmitter.

FIG. 4 is an operation timing chart of input signals and output signals based on the routing table of a connection request transmitter. FIG. 4 represents the timing charts of: the electric signals ES1($\lambda 1$) to ES4($\lambda 4$), corresponding to the optical wavelengths which are the input signals of the connection request transmitter 7 to the input light LI of the optical wavelengths $\lambda 1$ to $\lambda 4$ from the input terminal I1; and the connection request signals RE1(O1) to RE1(O4) which are the output signals to the SW connection request adjustment circuits for O1 to O4 based on the routing table.

Here, it is assumed that the relationship between each optical wavelength of the input light LI of the input terminal I1 and each output terminal is set beforehand in the routing table so that the optical wavelength $\lambda 1$ is output to the output terminal O2, the optical wavelength $\lambda 2$ to the output terminal O4, the optical wavelength $\lambda 3$ to the output terminal O1, and the optical wavelength $\lambda 4$ to the output terminal O3.

In the time zone of t1 to t2, the electric signal ES1($\square 1$) of the H level is input and the corresponding connection request signal RE2(O2) of the H level is output. Then, in the time zone of t3 to t4, the electric signal ES4($\lambda 4$) of the H level is input and the corresponding connection request signal RE3(O3) of the H level is output. Successively, in the time zone of t5 to t6, the electric signal ES3($\lambda 3$) of the H level is input and the corresponding connection request signal RE1(O1) of the H level is output. Thereafter, in the time zone of t7 and onward, the electric signal ES2($\lambda 2$) of the H level is input and the corresponding connection request signal RE4(O4) of the H level is output.

As a consequence, by setting the routing table, it is possible to output the input light LI of the optical wavelengths $\lambda 1$ to $\lambda 4$ input from the input terminal I1 from arbitrary output terminals O1 to O4.

Then, it is also possible to output the input light LI of the optical wavelengths $\lambda 1$ to $\lambda 4$ input from the input terminals I2 to I4 from arbitrary output terminals O1 to O4 by setting routing tables.

Figure 5:
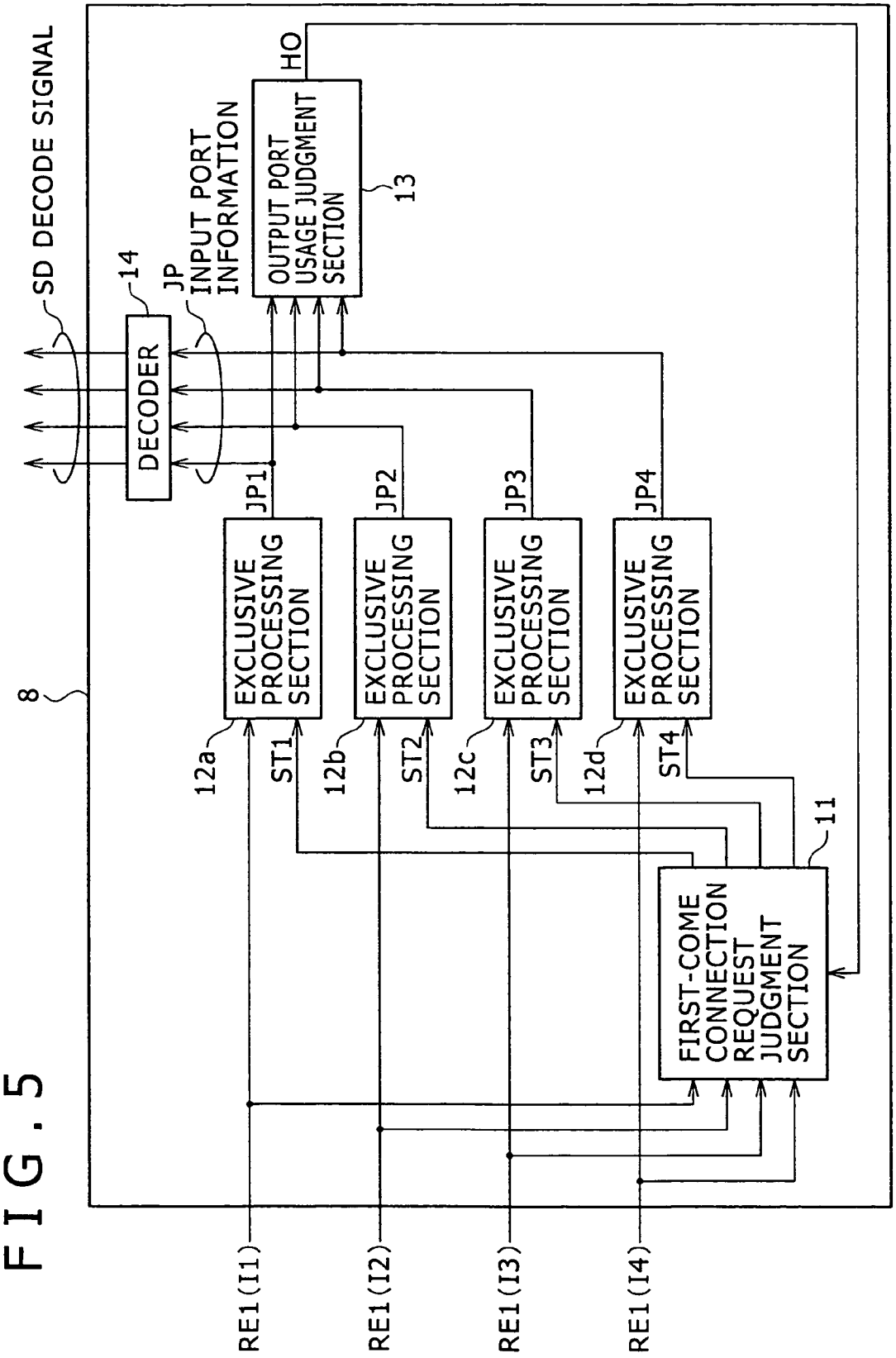
FIG. 5 is a block diagram of a switch connection request adjustment section.

FIG. 5 is a block diagram of a switch connection request adjustment section. In FIG. 5, the switch connection request adjustment section 8 includes the SW connection request adjustment circuits for O1 to O4 and each of them corresponding to the respective input terminals I1 to I4 is provided with a first-come connection request judgment section 11, exclusive processing sections 12, an output port usage judgment section 13, and a decoder 14. Here, though explanations are given for the SW connection request adjustment circuit for O1 and the processing of the input light LI of the optical wavelengths λ1 to λ4 input from the input terminals I1 and I2 in the present embodiment, the same explanations are also applicable to the SW connection request adjustment circuits for O2 to O4.

The first-come connection request judgment section 11 receives the connection request signals RE1(I1) to RE1(I4) supplied from the relevant connection request transmitters 7, and judges the first-come connection request signal RE (for example, the connection request signal RE1(I1)) on the basis of the judgment signal HO supplied from the output port usage judgment section 13. The first-come connection request judgment section 11 supplies the stop signals ST1 to ST4, which judge whether the passage (permeation) of the connection request signals RE1(I1) to RE1(I4) is allowed or stopped on the basis of judgment result, to the exclusive processing sections 12 (12a to 12d).

For example, in the case where the first-come connection request signal RE is the connection request signal RE1(I1), the first-come connection request judgment section 11 supplies, for example, the stop signal ST1 of the L level to the exclusive processing section 12a and allows the permeation of the connection request signal RE1(I1). Further, the first-come connection request judgment section 11 supplies, for example, the stop signals ST2 to ST4 of the H level to the exclusive processing sections 12b to 12d, and even when the connection request signals RE1(I2) to RE1(I4) are input, executes the exclusive processing of stopping or discarding the permeation of the connection request signals RE1(I2) to RE1(I4).

Here, even when the connection request signal RE1(I2) is input in succession to the connection request signal RE1(I1), in the case where the connection request signal RE1(I2) continues at the time of the completion of the connection request signal RE1(I1), the first-come connection request judgment section 11 supplies the stop signal ST2 of the L level to the exclusive processing section 12b, and allows the permeation of the connection request signal RE1(I2). At this time, the first-come connection request judgment section 11 supplies the stop signals ST1, ST3 and ST4 of the H level to the exclusive processing sections 12a, 12c and 12d respectively, and stops or discards the permeation of the connection request signals RE1(I1), RE1(I3) and RE1(I4).

The exclusive processing sections 12 are composed of the exclusive processing sections 12a to 12d and receive the connection request signals RE1(I1) to RE1(I4). The exclusive processing sections 12 allow the permeation of or stop the connection request signals RE1(I1) to RE1(I4) on the basis of the stop signals ST1 to ST4 supplied from the first-come connection request judgment section 11. In the case of the permeation of the connection request signals RE1(I1) to RE1 (I4), the exclusive processing sections 12 supply the input port information JP1 to JP4 to the output port usage judgment section 13 and the decoder 14

The output port usage judgment section 13 judges the input port information JP1 to JP4 supplied from the exclusive processing sections 12. The output port usage judgment section 13 supplies the judgment signal HO corresponding to the connection request signal RE (for example, the connection request signal RE1(I1)) to the first-come connection request judgment section 11 on the basis of the judged input port information JP1 to JP4. For example, when the input port information JP1 to JP4 is judged, the output port usage judgment section 13 outputs, for example, the judgment signal H0 of the H level. In contrast, when the input port information JP1 to JP4 is not judged, the output port usage judgment section 13 outputs, for example, the judgment signal H0 of the L level.

The decoder 14 supplies the coded decode signals SD to the optical matrix switch 2 in response to the input port information JP1 to JP4 supplied from the exclusive processing sections 12. By so doing, the decoder 14 drives the micro-mirrors of the optical matrix switch 2, forms optical paths, and connects the relevant input terminals I1 to I4 to the relevant output terminals O1 to O4. Here, when the input port information JP1 to JP4 does not exist, the decoder 14 outputs the decode signals SD to release the connection of the optical paths of the optical matrix switch 2.

Figure 6:
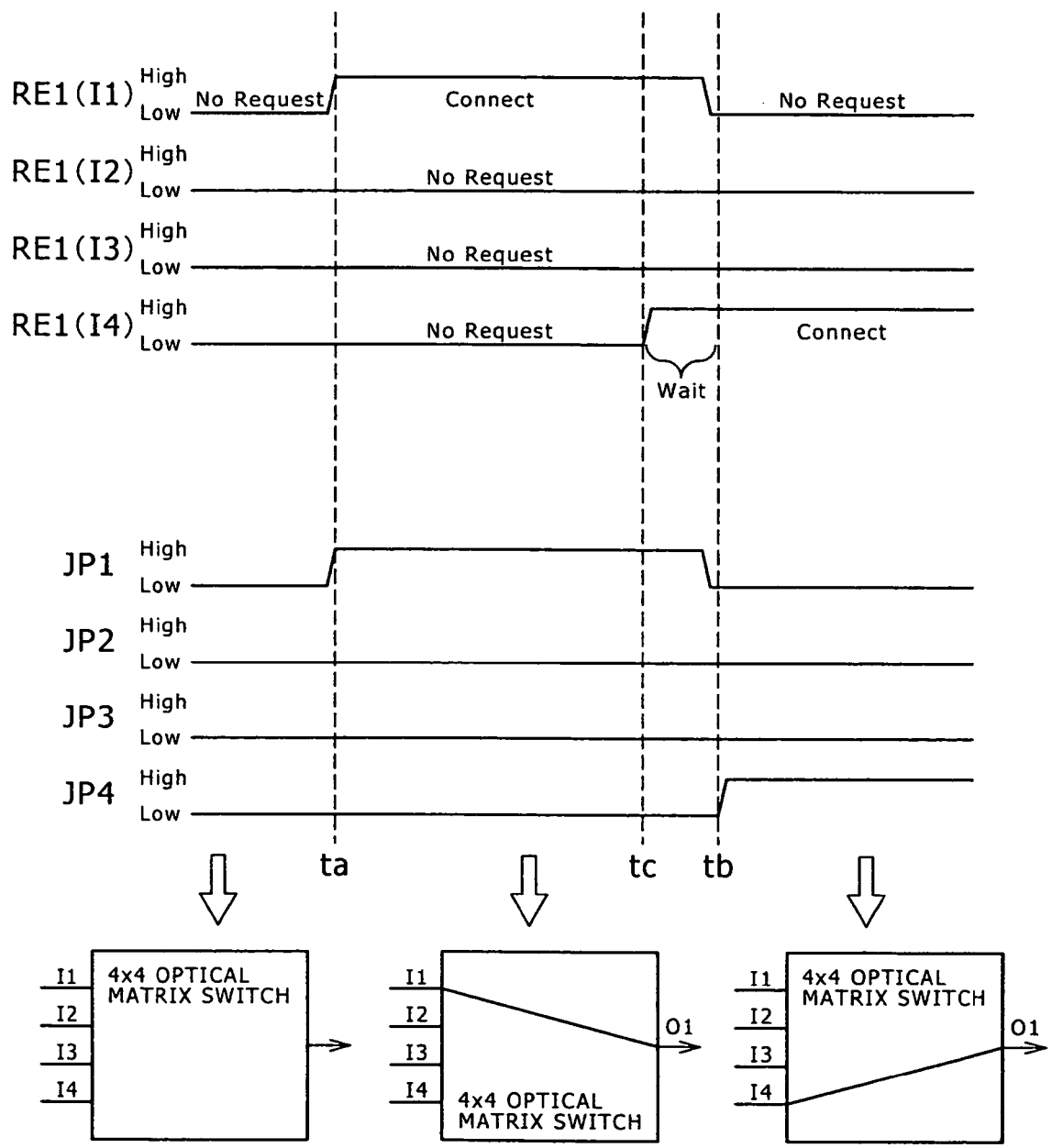
FIG. 6 is a block diagram of a switch connection request adjustment section.

FIG. 6 includes an input/output signal operation timing chart of a switch connection request adjustment section and a connection and control diagram of an optical matrix switch. Here, the switch connection request adjustment section 8 is explained: on the premise that the input signals are the connection request signals RE1(I1) to RE1(I4) and the output signals are the input port information JP1 to JP4; and on the basis of the cases where, as the means of connecting and controlling the optical matrix switch 2, the SW connection request adjustment circuit for O1 connects and controls the input terminal I1 and the output terminal O1, and the input terminal I4 and the output terminal O1.

In FIG. 6, in the time zone before ta, the connection request signals RE1(I1) to RE1(I4) are not activated, thus the switch connection request adjustment section 8 does not connect and control the optical matrix switch 2, and hence the optical matrix switch 2 is in the state of disconnection.

In the time zone of ta to tb, the connection request signal RE1(I1) is at the H level, the corresponding input port information JP3 is also at the H level, and hence the input terminal I1 and the output terminal O1 of the optical matrix switch 2 are connected and controlled (the input terminal I1 and the output terminal O1 are in the state of being connected to each other).

Further, in the time zone after tc in the middle of the time zone of ta to tb, though the connection request signal RE1(I4) is at the H level, the preceding connection request signal RE1(I1) is still at the H level in the time zone of tc to tb, and hence the connection request of the connection request signal RE1(I4) to the output terminal O1 is in the state of being stopped by the stop signal ST4 from the first-come connection request judgment section 11 shown in FIG. 5.

When the connection request signal RE1(I1) terminates (L level) at the time of tb, in the time zone after tb, the connection request signal RE1(I4) is at the H level and is validated, the corresponding input port information JP1 is also at the H level, and hence the input terminal I4 and the output terminal O1 of the optical matrix switch 2 are connected and controlled (the input terminal I4 and the output terminal O1 are in the state of being connected to each other).

As a consequence, it is possible to freely connect arbitrary input terminals I1 to I4 to arbitrary output terminals O1 to O4 in the optical matrix switch 2.

As explained above, the optical path decision section 3 includes the optical couplers 4 which divide the input light LI into two branches, supply the input light of one divided branch to the input ports PI1 to PI4 of the optical matrix switch 2, and supply the input light of the other divided branch to the wavelength filters 5, the wavelength filters 5 which demultiplex the input light LI from the optical couplers 4 into the light of individual wavelengths (optical wavelengths λ1 to λ4) and output the optical signals, the photodiodes 6 which photoelectrically convert the optical signals from the wavelength filters 5 and generate electric signals corresponding to the optical signals, the connection request transmitters 7 which receive the electric signals from the photodiodes 6 and output the connection request signals RE set beforehand for individual wavelengths, and the switch connection request adjustment section 8 which supplies the input port information JP corresponding to the connection request signals RE from the connection request transmitters 7 to the optical matrix switch. Hence, it is possible to decide the optical paths between the input ports (PI1 to PI4) and the output ports (PO1 to PO4) of the optical matrix switch 2 through electric signal processing, freely decide the optical paths with a simple structure, and secure flexibility.

Further, the optical path decision section 3 outputs the output light from arbitrary output ports PO1 to PO4 of the optical matrix switch 2 in accordance with the individual wavelengths of the input light LI input from arbitrary input ports PI1 to PI4 of the optical matrix switch 2 and hence it is possible to increase the degree of freedom in the use of the optical matrix switch 2 and improve user-friendliness.

Furthermore, the optical path decision section 3 is provided with the cross connect controller 9 which outputs wavelength-correspondent cross connect information JC, sets the access points of the connection request signals RE for individual wavelengths at the connection request transmitters 7, and makes it possible to change and set the wavelength-correspondent cross connect information JC. Hence, it is possible to arbitrarily decide the optical paths between the input ports PI1 to PI4 and the output ports PO1 to PO4 of the optical matrix switch 2 in accordance with the input optical wavelengths by setting the wavelength-correspondent cross connect information JC, and improve the usability of the optical matrix switch with simple setting of the wavelength-correspondent cross connect information.

Meanwhile, though the present embodiment has been explained on the basis of the case where a 4×4 optical matrix switch 2 is used, it is also possible to apply the present embodiment to a 5×5 or more, namely n×n, optical matrix switch likewise. In this case, the optical wavelengths are set at λ1 to λn, and the required numbers of input terminals I, output terminals O, optical couplers, wavelength filters, photodiodes, connection request transmitters, and switch connection request adjustment units are n or required numbers corresponding to n.

Next, explanations are given in the case of structuring a star-type network by applying the optical switch of the present embodiment. The star-type network includes an optical switch 1 having a 4×4 optical matrix switch and transmitters 19 to 22.

Figure 7:
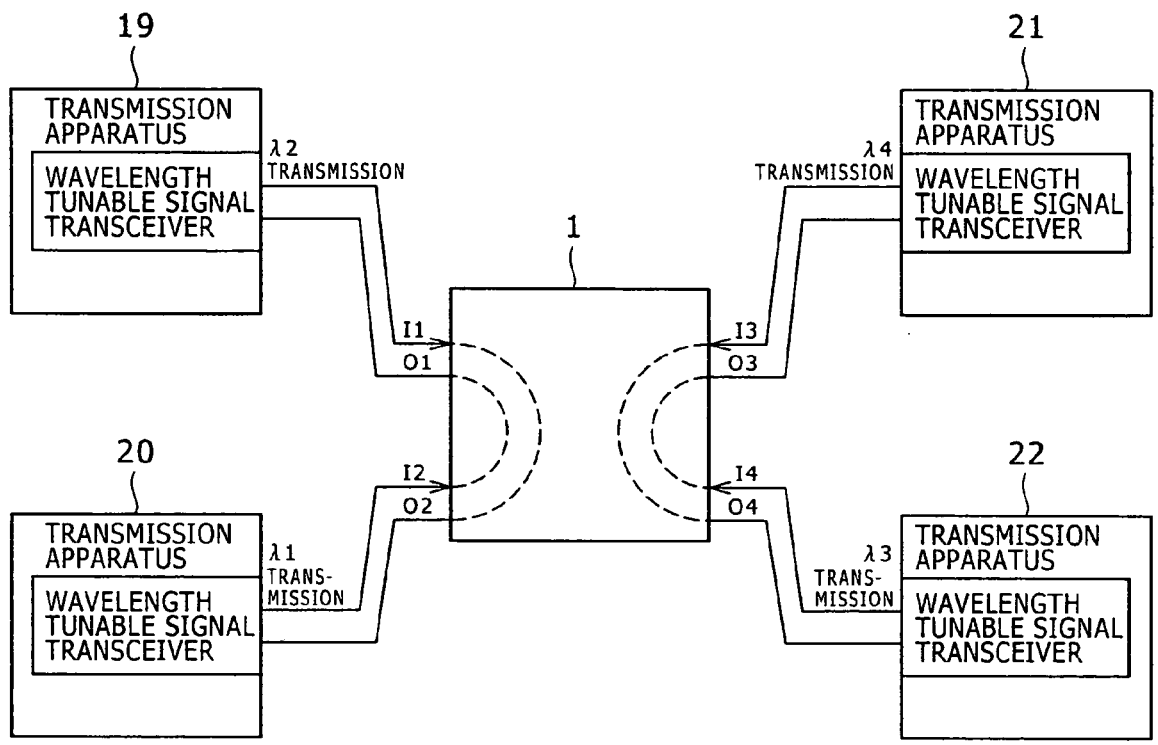
FIG. 7 is a diagram of a star-type network of an optical switch.

FIG. 7 is a diagram of a star-type network of an optical switch. In FIG. 7, the transmission apparatus 19 to 22, each of which is provided with a wavelength tunable signal transceiver, carry out optical communication between the transmission apparatus 19 and 20 through the optical switch 1 and likewise between the transmission apparatus 21 and 22 through the optical switch 1.

The input light LI of the optical wavelength λ2 transmitted from the transmission apparatus 19 is received by the transmission apparatus 20 through the path from the input terminal I1 to the output terminal O2 in the optical switch 1. Meanwhile, the input light LI of the optical wavelength λ1 transmitted from the transmission apparatus 20 is received by the transmission apparatus 19 through the path from the input terminal I2 to the output terminal O1 in the optical switch 1.

Further, the input light LI of the optical wavelength λ4 transmitted from the transmission apparatus 21 is received by the transmission apparatus 22 through the path from the input terminal I3 to the output terminal O4 in the optical switch 1. Meanwhile, the input light LI of the optical wavelength λ3 transmitted from the transmission apparatus 22 is received by the transmission apparatus 21 through the path from the input terminal I4 to the output terminal O3 in the optical switch 1.

Those paths are controlled on the basis of a routing table of the optical switch 1 which describes the relationship of the output terminals O1 to O4 to the input terminals I1 to I4 and the optical wavelengths λ1 to λ4.

Figure 8:
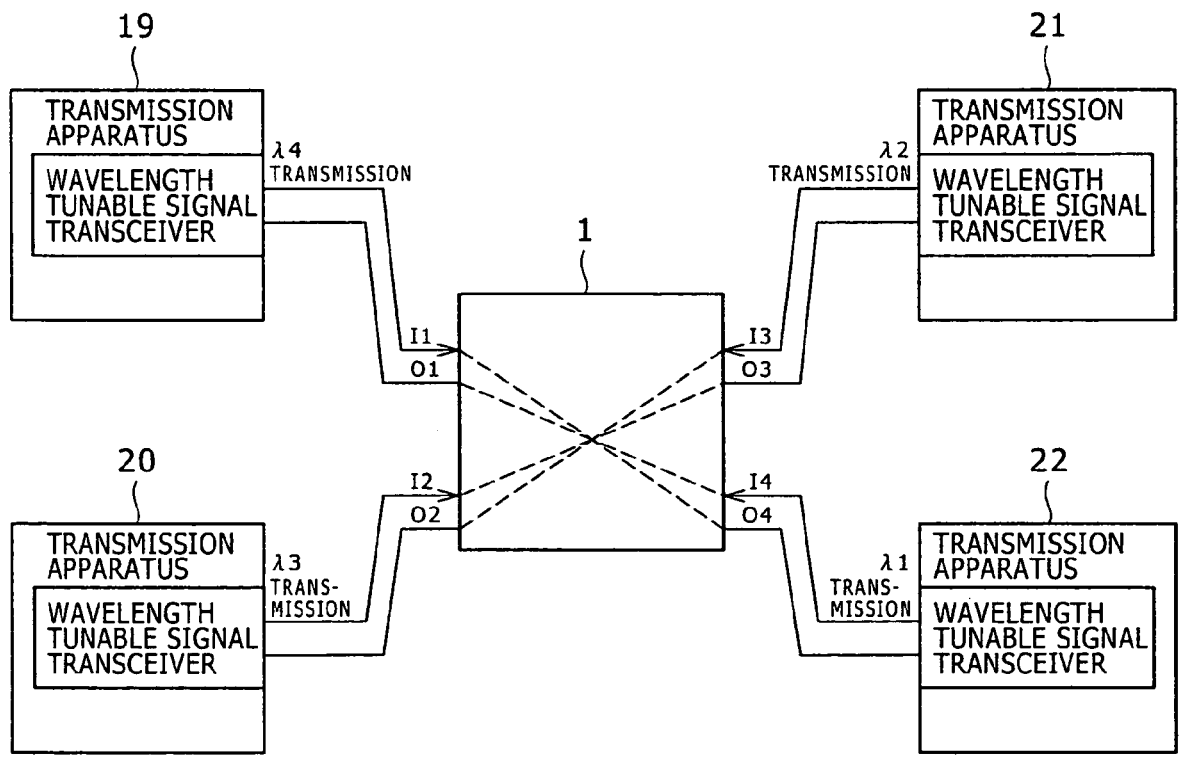
FIG. 8 is a diagram of another star-type network of an optical switch.

FIG. 8 is a diagram of another star-type network of an optical switch. In FIG. 8, the input light LI of the optical wavelength λ4 transmitted from the transmission apparatus 19 is received by the transmission apparatus 22 through the path from the input terminal I1 to the output terminal O4 in the optical switch 1. Meanwhile, the input light LI of the optical wavelength λ1 transmitted from the transmission apparatus 22 is received by the transmission apparatus 19 through the path from the input terminal I4 to the output terminal O1 in the optical switch 1.

Further, the input light LI of the optical wavelength λ3 transmitted from the transmission apparatus 20 is received by the transmission apparatus 21 through the path from the input terminal I2 to the output terminal O3 in the optical switch 1. Meanwhile, the input light LI of the optical wavelength λ2 transmitted from the transmission apparatus 21 is received by the transmission apparatus 20 through the path from the input terminal I3 to the output terminal O2 in the optical switch 1.

Those paths are controlled on the basis of the routing table of the optical switch 1 which describes the relationship of the output terminals O1 to O4 to the input terminals I1 to I4 and the optical wavelengths λ1 to λ4.

Successively, explanations are given in the case of structuring a mesh network by applying the optical switches of the present embodiment. The mesh network includes optical switches 15 to 18 having 5×5 optical matrix switches and transmission apparatus 19 to 23. Here, it is assumed that the optical communication is carried out between the transmission apparatus 19 and the transmission apparatus 21, and between the transmission apparatus 20 and the transmission apparatus 22 or the transmission apparatus 23.

Figure 9:
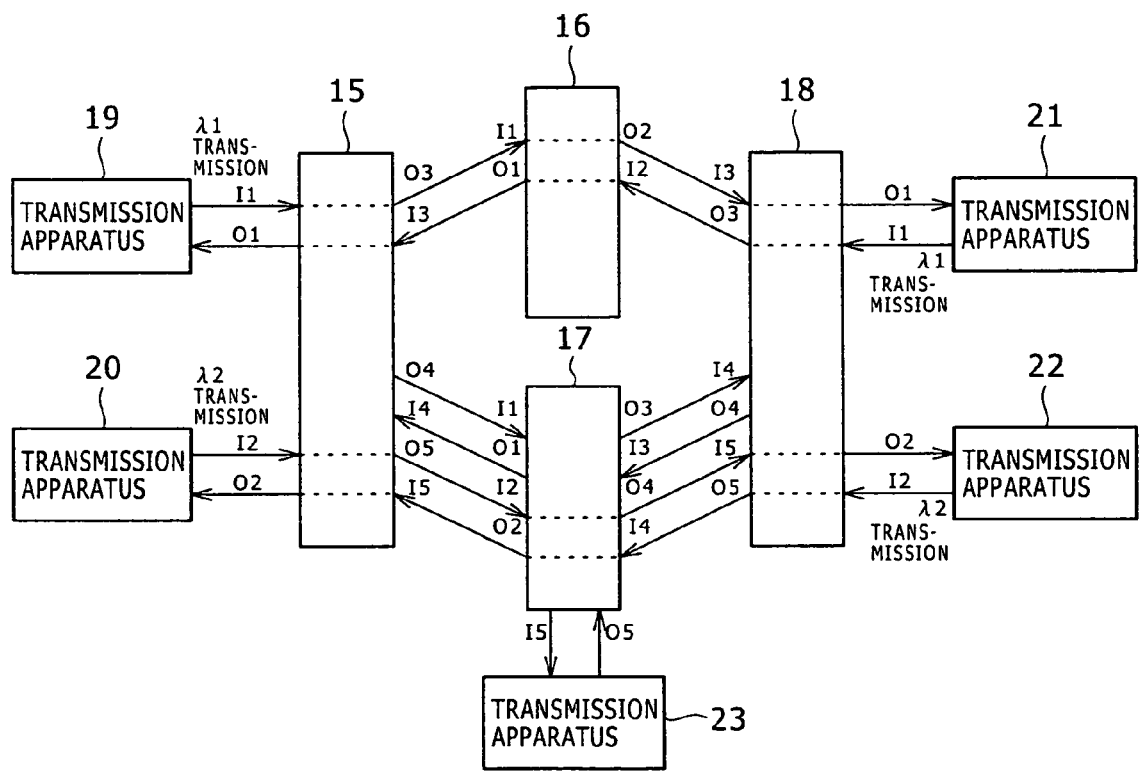
FIG. 9 is a diagram of a mesh network of optical switches.

FIG. 9 is a diagram of a mesh network of optical switches. In FIG. 9, optical communication between the transmission apparatus 19 and 21 is carried out through the path a including the optical switches 15, 16 and 18, and optical communication between the transmission apparatus 20 and 22 is carried out through the path b including the optical switches 15, 17 and 18.

The input light LI of the optical wavelength λ1 transmitted from the transmission apparatus 19 is received by the transmission apparatus 21 through the path a in the order of the input terminal I1 and the output terminal O3 of the optical switch 15, the input terminal I1 and the output terminal O2 of the optical switch 16, and the input terminal I3 and the output terminal O1 of the optical switch 18.

Meanwhile, the input light LI of the optical wavelength λ1 transmitted from the transmission apparatus 21 is received by the transmission apparatus 19 through the path a in the order of the input terminal I1 and the output terminal O3 of the optical switch 18, the input terminal I2 and the output terminal O1 of the optical switch 16, and the input terminal I3 and the output terminal O1 of the optical switch 15.

Further, the input light LI of the optical wavelength λ2 transmitted from the transmission apparatus 20 is received by the transmission apparatus 22 through the path b in the order of the input terminal I2 and the output terminal O5 of the optical switch 15, the input terminal I2 and the output terminal O4 of the optical switch 17, and the input terminal I5 and the output terminal O2 of the optical switch 18.

Meanwhile, the input light LI of the optical wavelength λ2 transmitted from the transmission apparatus 22 is received by the transmission apparatus 20 through the path b in the order of the input terminal I2 and the output terminal O5 of the optical switch 18, the input terminal I4 and the output terminal O2 of the optical switch 17, and the input terminal I5 and the output terminal O2 of the optical switch 15.

The paths a and b in the optical switch 15 are controlled on the basis of the routing table of the optical switch 15 which describes the relationship of the output terminals O1 to O5 to the input terminals I1 to I5 and the optical wavelengths λ1 to λ5. Further, the paths in the optical switches 16, 17 and 18 are also controlled on the basis of relevant routing tables.

Figure 10:
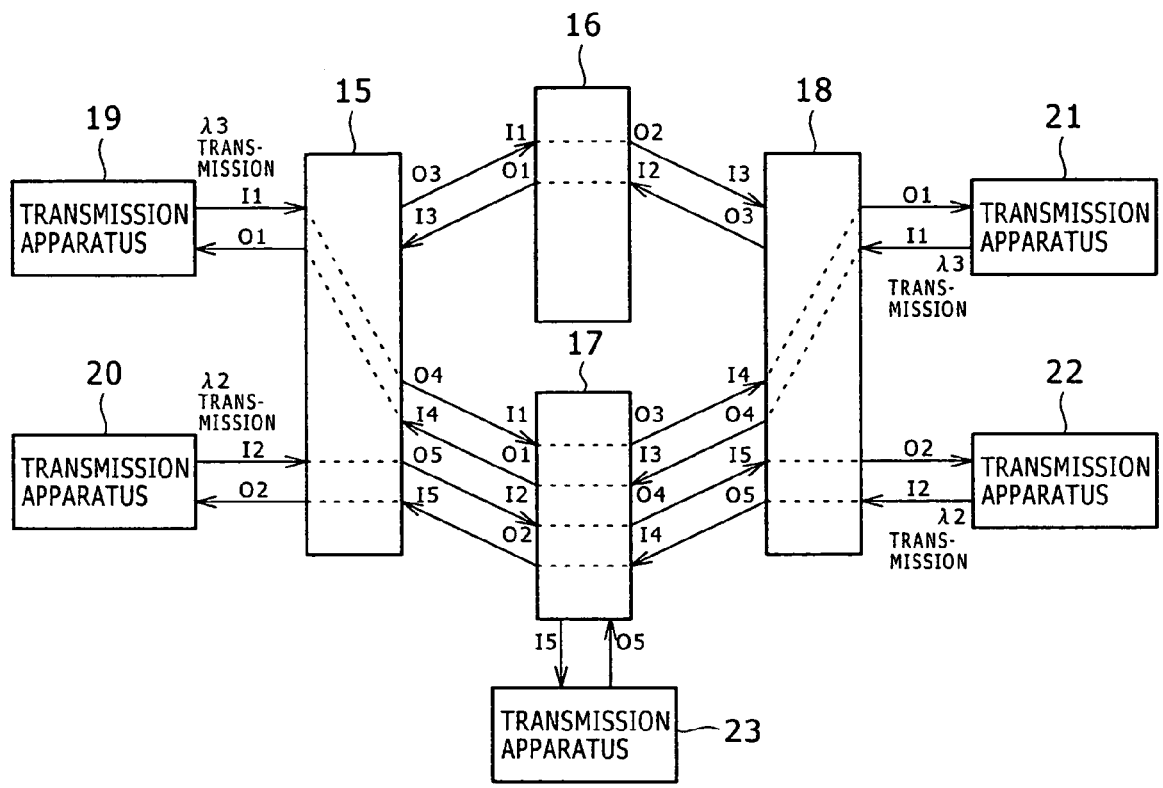
FIG. 10 is a diagram of another mesh network of optical switches.

FIG. 10 is a diagram of another mesh network of optical switches. In FIG. 10, optical communication between the transmission apparatus 19 and 21 is carried out through the path c including the optical switches 15, 17 and 18 while bypassing the path a shown in FIG. 9, and optical communication between the transmission apparatus 20 and 22 is carried out through the path b including the optical switches 15, 17 and 18 in the same way as FIG. 9.

The input light LI of the optical wavelength λ3 transmitted from the transmission apparatus 19 is received by the transmission apparatus 21 through the path c in the order of the input terminal I1 and the output terminal O4 of the optical switch 15, the input terminal I1 and the output terminal O3 of the optical switch 17, and the input terminal I4 and the output terminal O1 of the optical switch 18.

Meanwhile, the input light LI of the optical wavelength λ3 transmitted from the transmission apparatus 21 is received by the transmission apparatus 19 through the path c in the order of the input terminal I1 and the output terminal O4 of the optical switch 18, the input terminal I3 and the output terminal O1 of the optical switch 17, and the input terminal I4 and the output terminal O1 of the optical switch 15.

Further, the input light LI of the optical wavelength λ2 transmitted from the transmission apparatus 20 is received by the transmission apparatus 22 through the path b in the order of the input terminal I2 and the output terminal O5 of the optical switch 15, the input terminal I2 and the output terminal O4 of the optical switch 17, and the input terminal I5 and the output terminal O2 of the optical switch 18.

Meanwhile, the input light LI of the optical wavelength λ2 transmitted from the transmission apparatus 22 is received by the transmission apparatus 20 through the path b in the order of the input terminal I2 and the output terminal O5 of the optical switch 18, the input terminal I4 and the output terminal O2 of the optical switch 17, and the input terminal I5 and the output terminal O2 of the optical switch 15.

The paths b and c in the optical switch 15 are controlled on the basis of the routing table of the optical switch 15 which describes the relationship of the output terminals O1 to O5 to the input terminals I1 to I5 and the optical wavelengths λ1 to λ5. Further, the paths in the optical switches 16, 17 and 18 are also controlled on the basis of relevant routing tables.

Figure 11:
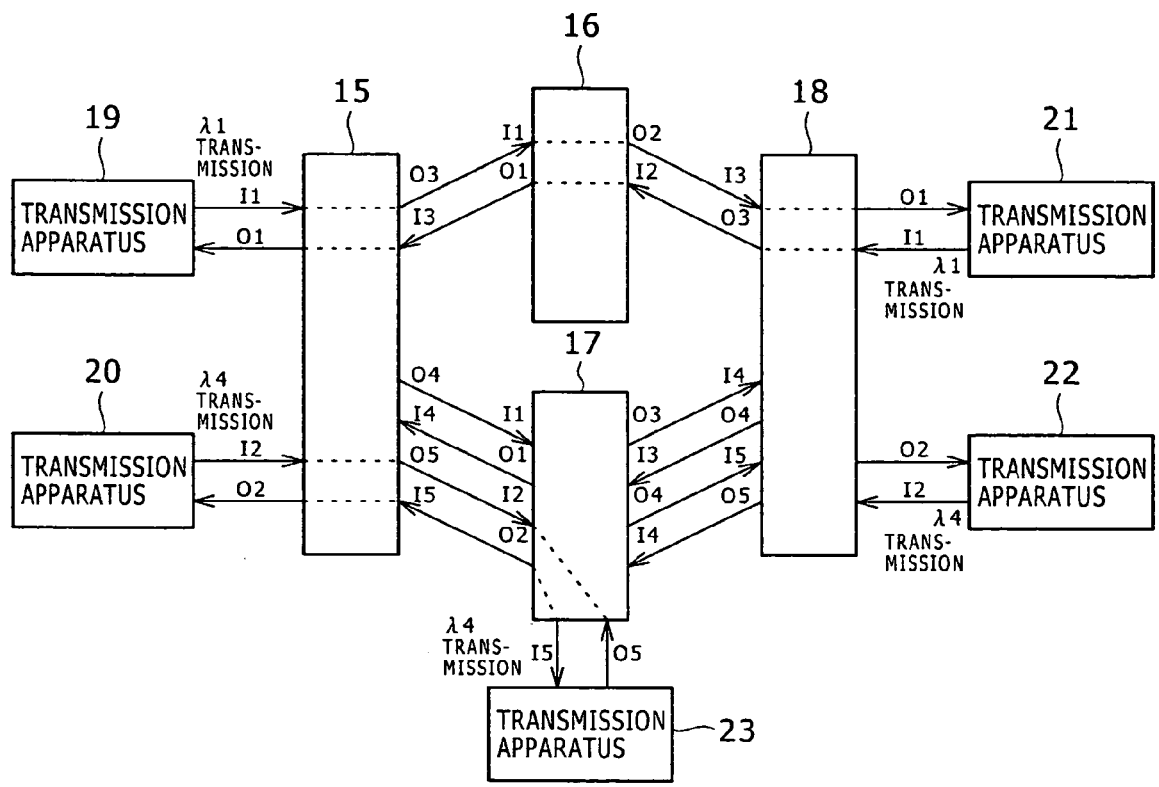
FIG. 11 is a diagram of yet another mesh network of optical switches.

FIG. 11 is a diagram of yet another mesh network of optical switches. In FIG. 11, optical communication between the transmission apparatus 19 and 21 is carried out through the path a including the optical switches 15, 16 and 18 in the same way as FIG. 9, and optical communication between the transmission apparatus 20 and 23 is carried out through the path d including the optical switches 15 and 17.

The input light LI of the optical wavelength λ1 transmitted from the transmission apparatus 19 is received by the transmission apparatus 21 through the path a in the order of the input terminal I1 and the output terminal O3 of the optical switch 15, the input terminal I1 and the output terminal O2 of the optical switch 16, and the input terminal I3 and the output terminal O1 of the optical switch 18.

Meanwhile, the input light LI of the optical wavelength λ1 transmitted from the transmission apparatus 21 is received by the transmission apparatus 19 through the path a in the order of the input terminal I1 and the output terminal O3 of the optical switch 18, the input terminal I2 and the output terminal O1 of the optical switch 16, and the input terminal I3 and the output terminal O1 of the optical switch 15.

Further, the input light LI of the optical wavelength λ4 transmitted from the transmission apparatus 20 is received by the transmission apparatus 23 through the path d in the order of the input terminal I2 and the output terminal O5 of the optical switch 15, and the input terminal I2 and the output terminal O5 of the optical switch 17.

Meanwhile, the input light LI of the optical wavelength λ4 transmitted from the transmission apparatus 23 is received by the transmission apparatus 20 through the path d in the order of the input terminal I5 and the output terminal O2 of the optical switch 17, and the input terminal I5 and the output terminal O2 of the optical switch 15.

The paths a and d in the optical switch 15 are controlled on the basis of the routing table of the optical switch 15 which describes the relationship of the output terminals O1 to O5 to the input terminals I1 to I5 and the optical wavelengths λ1 to λ5. Further, the paths in the optical switches 16, 17 and 18 are also controlled on the basis of relevant routing tables.

Figure 12:
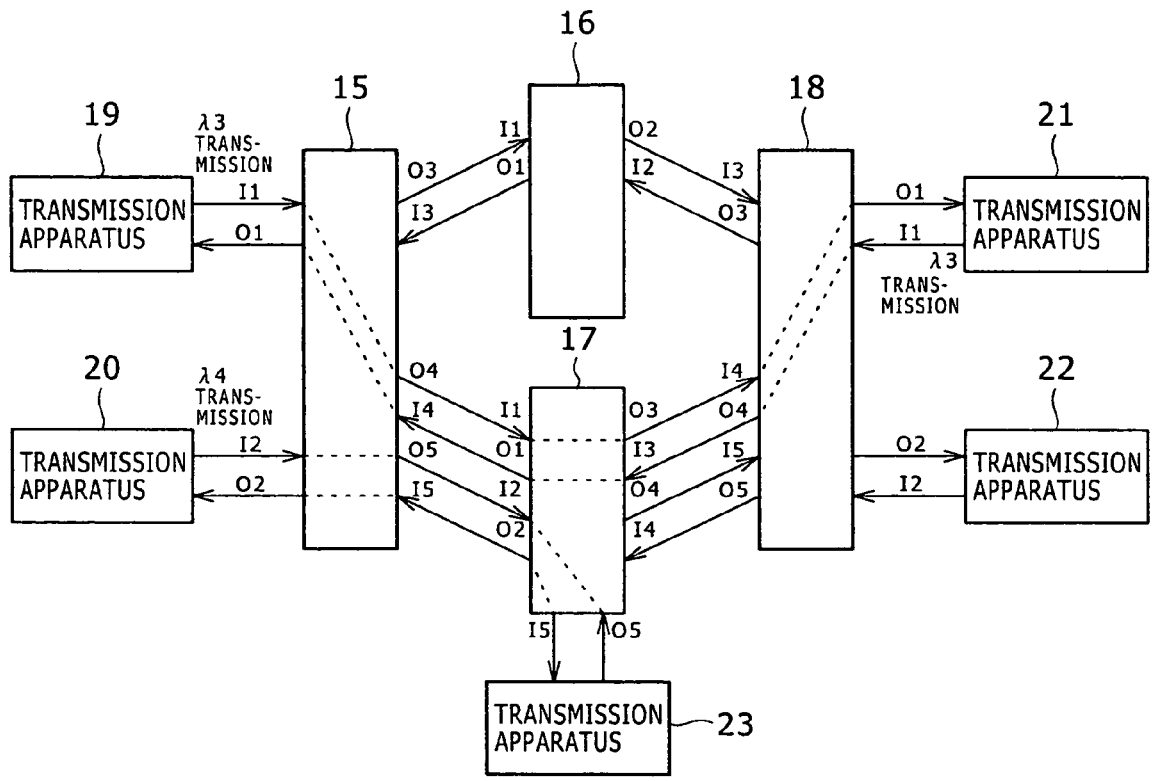
FIG. 12 is a diagram of still another mesh network of optical switches.

FIG. 12 is a diagram of still another mesh network of optical switches. In FIG. 12, optical communication between the transmission apparatus 19 and 21 is carried out through the path c including the optical switches 15, 17 and 18 in the same way as FIG. 10, and optical communication between the transmission apparatus 20 and 23 is carried out through the path d including the optical switches 15 and 17 in the same way as FIG. 11.

The input light LI of the optical wavelength λ3 transmitted from the transmission apparatus 19 is received by the transmission apparatus 21 through the path c in the order of the input terminal I1 and the output terminal O4 of the optical switch 15, the input terminal I1 and the output terminal O3 of the optical switch 17, and the input terminal I4 and the output terminal O1 of the optical switch 18.

Meanwhile, the input light LI of the optical wavelength λ3 transmitted from the transmission apparatus 21 is received by the transmission apparatus 19 through the path c in the order of the input terminal I1 and the output terminal O4 of the optical switch 18, the input terminal I3 and the output terminal O1 of the optical switch 17, and the input terminal I4 and the output terminal O1 of the optical switch 15.

Further, the input light LI of the optical wavelength λ4 transmitted from the transmission apparatus 20 is received by the transmission apparatus 23 through the path d in the order of the input terminal I2 and the output terminal O5 of the optical switch 15, and the input terminal I2 and the output terminal O5 of the optical switch 17.

Meanwhile, the input light LI of the optical wavelength λ4 transmitted from the transmission apparatus 23 is received by the transmission apparatus 20 through the path d in the order of the input terminal I5 and the output terminal O2 of the optical switch 17, and the input terminal I5 and the output terminal O2 of the optical switch 15.

The paths c and d in the optical switch 15 are controlled on the basis of the routing table of the optical switch 15 which describes the relationship of the output terminals O1 to O5 to the input terminals I1 to I5 and the optical wavelengths λ1 to λ5. Further, the paths in the optical switches 16, 17 and 18 are also controlled on the basis of relevant routing tables.

As stated above, the optical switches 15 to 18 are connected in a multistage form and can be applied to a mesh network. Therefore, it is possible to structure a mesh network relatively simply by selecting optical switches, setting wavelength-correspondent cross connect information (routing table) of each of the optical switches 15 to 18, and connecting the optical switches, secure the expandability in the application to a mesh network, and also change the paths at a high speed of the same level as the processing delay level in an electric circuit in accordance with the optical wavelengths of the input signals to optical switches.

FIG. 13 is an illustration explaining services of optical switches. In FIG. 13, supercomputers of universities A to C are interconnected with optical switches A to C and thus an optical communication network is constructed. Then, in a certain time zone, in order to cooperatively operate the supercomputers among the universities A to C, optical signals of the optical wavelength λ1 and the paths through the universities A, B and C are used.

In another time zone, in order to cooperatively operate the supercomputers between the universities B and C, excluding the university A, optical signals of the optical wavelength λ2 and the path between the universities B and C are used.

FIG. 14 is an illustration explaining other services of optical switches. In FIG. 14, the internet, a server of a data center, and a backup server of a backup center are interconnected with optical switches A to C and thus an optical communication network is constructed. Then, in the daytime, two paths for the optical wavelengths λ1 and λ2 are used between the internet and the server of the data center.

At night, one path for the optical wavelengths λ1 is used between the internet and the server of the data center, and the optical wavelengths λ3 is used between the server of the data center and the backup server of the backup center, and the path change is carried out. Here, the ports of the optical switch B used for the path change are shared by the optical wavelengths λ1 and λ3.

As explained above, the optical switch 1 is provided with an optical matrix switch 2 which has plural input ports and plural output ports and outputs input light coming from the input ports from the output ports, and an optical path decision section 3 which divides input light from each of input terminals into two branches, supplies the input light of one divided branch to the input ports of the optical matrix switch, demultiplexes the input light of the other divided branch into the light of individual wavelengths, subjects the demultiplexed optical signals to photoelectric conversion and generates electric signals corresponding to individual wavelengths, supplies to the optical matrix switch the input port information corresponding to connection request signals which are set beforehand for individual wavelengths by receiving the electric signals, and decides the optical paths from the input ports to intended output ports in the optical matrix switch. Hence, it is possible to divide input light, generate electric signals by applying photoelectric conversion corresponding to the wavelengths, output connection request signals set beforehand for individual wavelengths when the electric signals are recognized; decide the optical paths by connecting the input ports to which input light is input to the output ports in an optical matrix switch in accordance with input port information corresponding to the connection request signals, and freely decide optical paths between arbitrary input ports and arbitrary output ports in the optical matrix switch.

Figure 15:
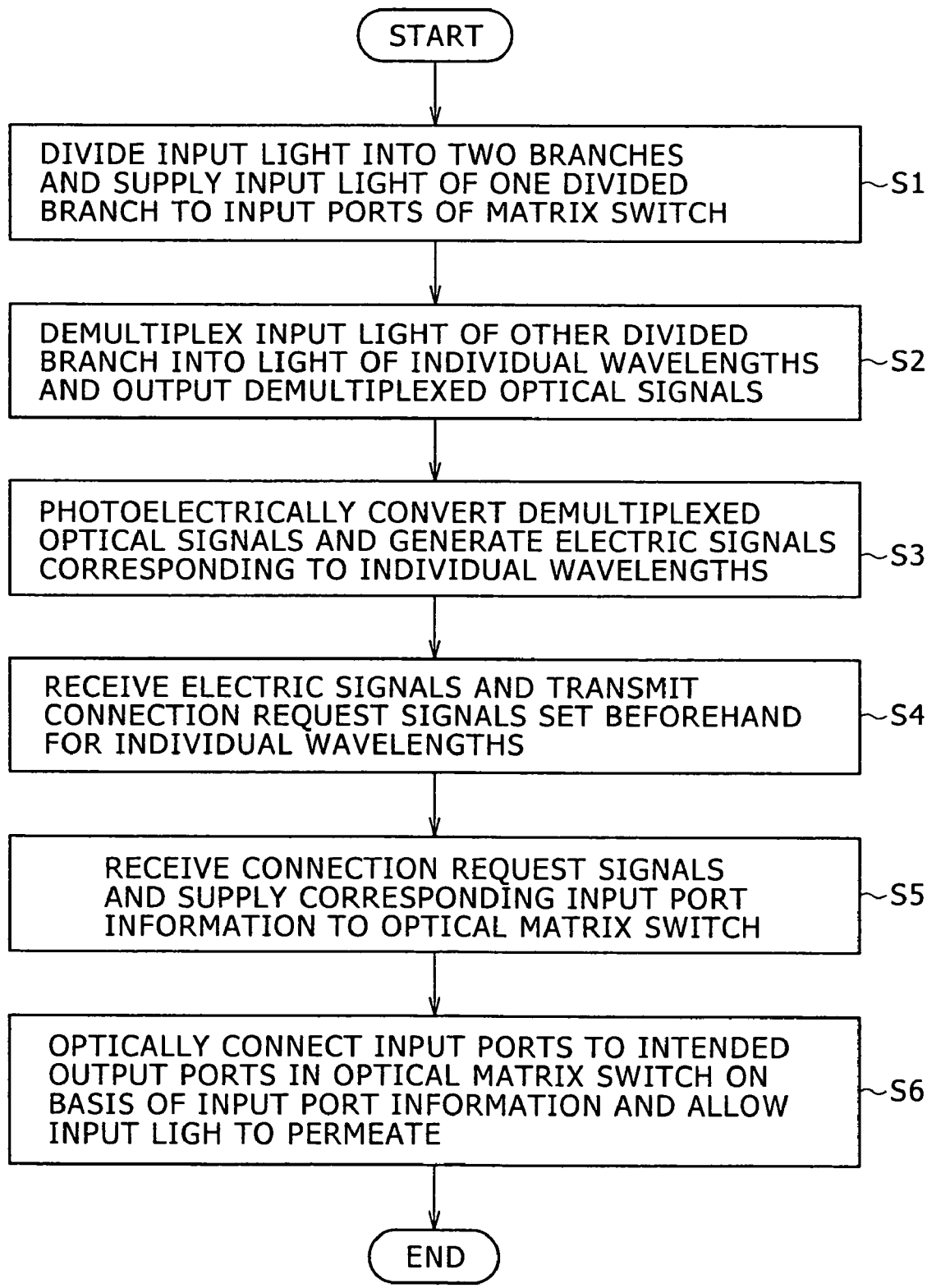
FIG. 15 is a flow diagram showing the operation in the optical path control method of an optical switch.

Next, the method for controlling the optical paths of an optical switch is explained. FIG. 15 is a flow diagram showing the operation of the optical path control method of an optical switch. In FIG. 15, at the step S1, input light is divided into two branches and the input light of one divided branch is supplied to the input ports of the optical matrix switch. At the step S2, the input light of the other divided branch is demultiplexed into the light of individual wavelengths and the demultiplexed optical signals are output. At the step S3, the demultiplexed optical signals are subjected to photoelectric conversion and electric signals corresponding to individual wavelengths are generated. At the step S4, the electric signals are received and connection request signals are transmitted to connection request adjustment circuits corresponding to the output ports which are set beforehand for individual wavelengths. At the step S5, the connection request signals are received and the corresponding input port information is supplied to the optical matrix switch. At the step S6, the input ports are optically connected to intended output ports in the optical matrix switch on the basis of the input port information and the input light permeates.

As stated above, the optical path control method of an optical switch includes the step S1 of dividing input light into two branches and supplying the input light of one divided branch to the input ports of the optical matrix switch, the step S2 of demultiplexing the input light of the other divided branch into the light of individual wavelengths and outputting the demultiplexed optical signals, the step S3 of subjecting the demultiplexed optical signals to photoelectric conversion and generating electric signals corresponding to individual wavelengths, the step S4 of receiving the electric signals and transmitting connection request signals which are set beforehand for individual wavelengths, the step S5 of receiving the connection request signals and supplying the corresponding input port information to the optical matrix switch, and the step S6 of optically connecting the input ports to intended output ports in the optical matrix switch on the basis of the input port information and allowing the input light to permeate. Hence, it is possible to decide the optical paths between the input ports and the output ports in the optical matrix switch through electric signal processing, and freely decide optical paths between arbitrary input ports and arbitrary output ports in the optical matrix switch.

Figure 16:
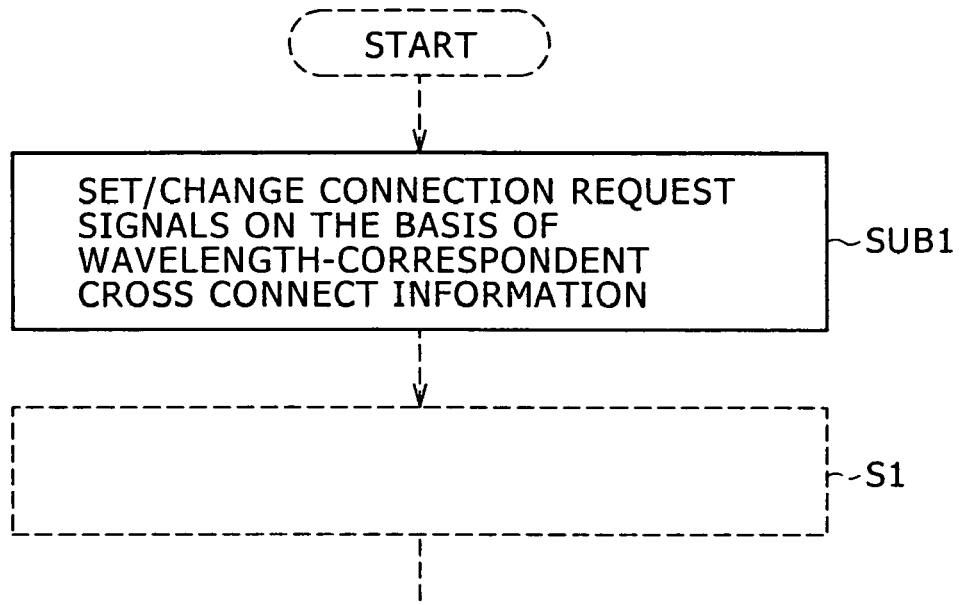
FIG. 16 is a flow diagram showing a part of the operation in the optical path control method of an optical switch.

FIG. 16 is a flow diagram showing a part of the operation in the optical path control method of an optical switch. At the step S1 in FIG. 15, the sub-step SUB1 of setting and changing the connection request signals on the basis of wavelength-correspondent cross connect information is added.

As stated above, the optical path control method of an optical switch is provided with the sub-step SUB1 of setting and changing the connection request signals on the basis of wavelength-correspondent cross connect information. Hence, by only setting and rewriting the wavelength-correspondent cross connect information, it is possible to decide the optical paths between the input ports and the output ports in the optical matrix switch, and improve the usability of the optical matrix switch.

Figure 17:
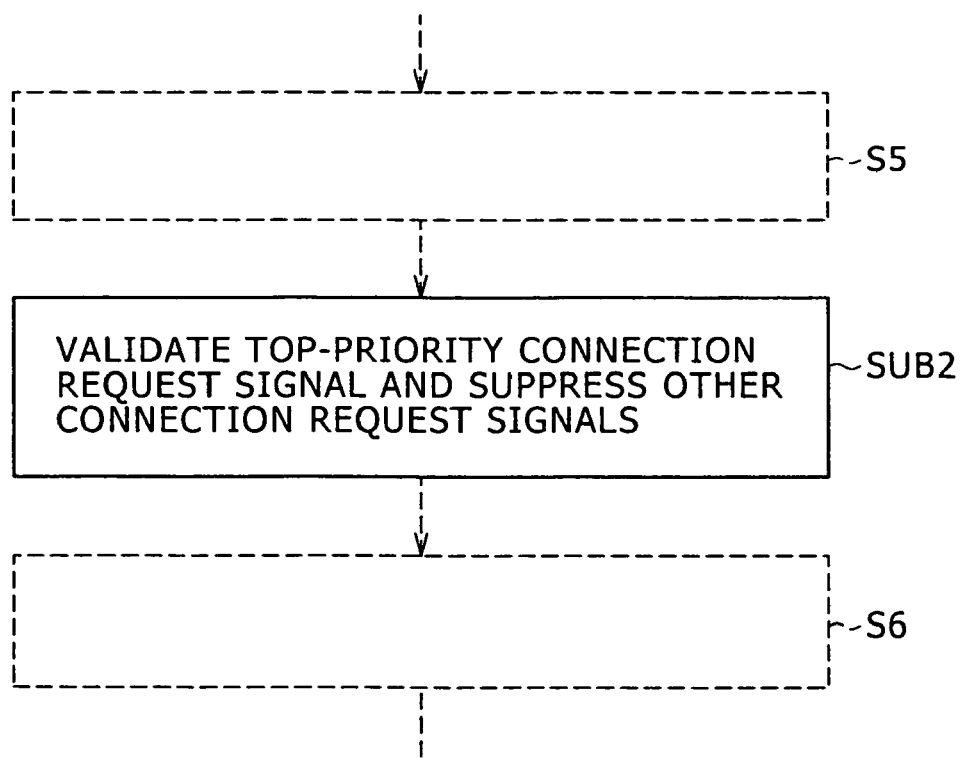
FIG. 17 is a flow diagram showing a part of the operation in the optical path control method of an optical switch.

FIG. 17 is a flow diagram showing a part of the operation in the optical path control method of an optical switch. Sub-step SUB2 of suppressing other connection request signals is added after the step S5 in FIG. 15.

As stated above, the optical path control method of an optical switch is provided with the sub-step SUB2 of validating the top-priority connection request signal and suppressing the other connection request signals. Hence, when plural connection request signals exist simultaneously, it is possible to validate only the top-priority connection request signal, and prevent plural number of input light from colliding with each other on optical paths of the optical matrix switch.

The optical switch according to the present embodiment makes it possible to divide input light into branches, subject the branched input light to photoelectric conversion corresponding to individual wavelengths, thus generate electric signals, decide optical paths by connecting the input ports to which the input light is input to output ports on the basis of the electric signals, and freely decide optical paths between arbitrary input ports and arbitrary output ports in the optical matrix switch. Hence the switch can be applied to any kind of an optical switch to decide the optical paths in the optical matrix switch.

The optical switch is provided with an optical matrix switch which has plural input ports and plural output ports and outputs input light coming from the input ports from the output ports, and an optical path decision section which divides the input light from each of input terminals into two branches, supplies the input light of one divided branch to the input ports of the optical matrix switch, demultiplexes the input light of the other divided branch into the light of individual wavelengths, subjects the demultiplexed optical signals to photoelectric conversion and generates electric signals corresponding to individual wavelengths, supplies to the optical matrix switch the input port information corresponding to connection request signals which are set beforehand for individual wavelengths by receiving the electric signals, and decides the optical paths from the input ports to intended output ports in the optical matrix switch. As a consequence, it is possible to divide input light, generate electric signals by applying photoelectric conversion corresponding to the wavelengths, output connection request signals set beforehand for individual wavelengths when the electric signals are recognized, decide the optical paths by connecting the input ports to which input light is input to the output ports in the optical matrix switch in accordance with input port information corresponding to the connection request signals, and freely decide optical paths between arbitrary input ports and arbitrary output ports in the optical matrix switch.

Further, the optical path control method of an optical switch includes the steps of dividing input light into two branches and supplying the input light of one divided branch to input ports of the optical matrix switch, demultiplexing the input light of the other divided branch into the light of individual wavelengths and outputting the demultiplexed optical signals, subjecting the demultiplexed optical signals to photoelectric conversion and generating electric signals corresponding to individual wavelengths, receiving the electric signals and transmitting connection request signals which are set beforehand for individual wavelengths, receiving the connection request signals and supplying the corresponding input port information to the optical matrix switch, and optically connecting the input ports to intended output ports in the optical matrix switch on the basis of the input port information and allowing the input light to permeate. As a consequence, it is possible to decide the optical paths between the input ports and the output ports in the optical matrix switch through electrical signal processing, and freely decide optical paths between arbitrary input ports and arbitrary output ports in the optical matrix switch.

What is claimed is:

1. An optical switch for setting optical paths of input optical signals, said optical switch comprising:
    an optical matrix switch having a plurality of input ports and a plurality of output ports, said optical matrix switch outputting an input optical signal coming from one of the input ports to one of the output ports; and
    an optical path decision section comprising:
        a plurality of switch connection request adjustment sections for setting optical paths between each of the output ports of said optical matrix switch and one of the input ports,
        a plurality of wavelength filters for receiving input optical signals, and outputting optical signals having individual wavelengths to respective output ports,
        a plurality of optical couplers for dividing said input optical signals having a different wavelength from each other into two branches respectively, supplying input optical signals of a first divided branch to said input ports, and supplying input optical signals of a second divided branch to said plurality of wavelength filters,
        a plurality of photodiodes for connecting each port of the wavelength filters, and photoelectrically converting each optical signal into a corresponding electrical signal, and
        a plurality of connection request transmitters for deciding a wavelength of a selected optical signal depending on the corresponding electrical signal from one of the photodiodes, and outputting connection request signal to one of the connection request adjustment sections for connecting a first input port to a first output port,
    wherein said first input port is one of the input ports of the optical matrix switch where the selected optical signal was supplied from the first divided branch,
    wherein said first output port is one of the output ports of the optical matrix switch for the one of the connection request adjustment sections, and
    wherein the connection request adjustment section receiving the connection request signal sets the optical path depending on the received connection request signal.

2. The optical switch according to claim 1, wherein said optical path decision section is provided with a cross connect controller which outputs wavelength-correspondent cross connect information, sets access points of the connection request signals for individual wavelengths at said connection request transmitters, and makes it possible to change and set the wavelength-correspondent cross connect information.

3. The optical switch according to claim 1, wherein said optical path decision section outputs optical light input from arbitrary said input ports of said optical matrix switch from arbitrary said output ports of said optical matrix switch.

4. The optical switch according to claim 1, wherein said optical switch is connected in a multistage form and can be applied to a mesh network.

5. The optical switch according to claim 2, wherein said optical switch is connected in a multistage form and can be applied to a mesh network.

6. The optical switch according to claim 3, wherein said optical switch is connected in a multistage form and can be applied to a mesh network.

7. A method for controlling optical paths of an optical switch, comprising:
    dividing input optical signals having a different wavelength from each other into two branches respectively and supplying said input optical signals of a first divided branch to the input ports of an optical matrix switch;
    passing said input optical signals of a second divided branch through an optical wavelength filter and demultiplexing them into individual wavelength optical signals;

converting said individual wavelength optical signals into electrical signals and judging the wavelengths of said optical signals depending on the receiving port of the optical wavelength filter;

requesting connection between a first output port of the optical matrix switch and a first input port of the optical matrix switch for the one optical signal which was branched from the other optical signal corresponding to the electrical signal, depending on the judged wavelength;

receiving the connection request signals and supplying the corresponding input port information to the optical matrix switch; and optically connecting input ports to intended output ports in the optical matrix switch on the basis of the input port information and allowing the input light to permeate.

8. The method for controlling optical paths of an optical switch according to claim 7, wherein a sub-step (SUB1) of setting and changing the connection request signals on the basis of wavelength-correspondent cross connect information is added to said step of dividing.

9. The method for controlling optical paths of an optical switch according to claim 7, wherein a sub-step (SUB2) of validating a top-priority connection request signal and suppressing the other connection request signals is added to said step of receiving.

* * * * *

UNITED STATES PATENT AND TRADEMARK OFFICE
CERTIFICATE OF CORRECTION

PATENT NO. : 7,580,636 B2
APPLICATION NO. : 11/324316
DATED : August 25, 2009
INVENTOR(S) : Yoshio Nogi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this

Fourteenth Day of September, 2010

David J. Kappos
*Director of the United States Patent and Trademark Office*